3,641,040
TERTIARY AMINO PHENYL ACETIC ACIDS
Richard William James Carney, New Providence, and George de Stevens, Summit, N.J., assignors to Ciba Corporation, Summit, N.J.
No Drawing. Continuation-in-part of application Ser. No. 808,343, Mar. 18, 1969, which is a continuation-in-part of application Ser. No. 790,863, Jan. 13, 1969, which is a continuation-in-part of application Ser. No. 757,136, Sept. 3, 1968, which in turn is a continuation-in-part of application Ser. No. 716,347, Mar. 27, 1968. This application July 18, 1969, Ser. No. 843,244
Int. Cl. C07d 29/24
U.S. Cl. 260—293.72          4 Claims

ABSTRACT OF THE DISCLOSURE

New α-(cyclic tert. aminophenyl)-aliphatic acids, e.g. those of the formula

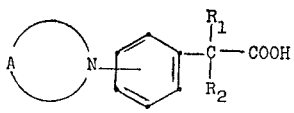

$R_1$=H or alkyl
$R_2$=H, alk(en)yl, cycloalk(en)yl or cycloalk(en)yl-alkyl
A=alk(en)ylene, aza-, oxa, or thiaalkylene and functional derivatives thereof, are anti-inflammatory agents.

CROSS-REFERENCES TO RELATED APPLICATIONS

This in a continuation-in-part of application Ser. No. 808,343, filed Mar. 18, 1969, which in turn is a continuation-in-part of application Ser. No. 790,863, filed Jan. 13, 1969, which in turn is a continuation-in-part of application Ser. No. 757,136, filed Sept. 3, 1968, which in turn is a continuation-in-part of application Ser. No. 716,347, filed Mar. 27, 1968, and now abandoned.

SUMMARY OF THE INVENTION

The present invention concerns and has for its object the provision of new α-(cyclic tert. aminophenyl)-aliphatic acids of the Formula I

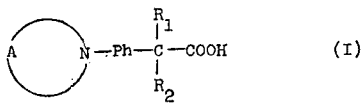

in which $R_1$ is hydrogen or lower alkyl, $R_2R$ is hydrogen, lower alkyl, alkenyl, cycloalkyl, cycloalkenyl, cycloalkyl-alkyl or cycloalkenyl-alkyl, Ph is a phenylene radical, and A is a lower alkylene, alkenylene or aza-, oxa- or thiaalkylene radical wherein 2 heteroatoms are separated by at least 1 carbon atom, of therapeutically acceptable functional acid or amino derivatives thereof, as well as of corresponding pharmaceutical compositions and of methods for the preparation and application of these products. Said compositions are useful antiinflammatory agents in the treatment or management of arthritic and dermatopathologic conditions.

DESCRIPTION OF THE PREFERRED EMBODIMENT

The lower alkyl radicals $R_1$ or $R_2$ represent, for example, methyl, ethyl, n- or i-propyl, -buyl, -pentyl, -hexyl or -heptyl. A lower alkenyl radical $R_2$ is, for example, vinyl, allyl, methallyl, 3-buteny or 1-pentenyl. The term "lower," referred to above and hereinafter in connection with organic radicals or compounds respectively, defines such with up to 7, preferably up to 4, carbon atoms.

A cycloalkyl or cycloalkenyl radical $R_2$ is preferably 3 to 7 ring-membered and unsubstituted or substituted by up to 4 lower alkyls, such as cyclopropyl, 1- or 2-methyl-cyclopropyl, 1,2-, 2,2- or 2,3-dimethyl-cyclopropyl, 1,2,2- or 1,2,3-trimethyl-cyclopropyl or 2,2,3,3-tetramethyl-cyclopropyl, cyclobutyl, 3,3-dimethyl-cyclobutyl or 2,2,3-trimethyl-cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,5-dimethylcyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1 or 2-cyclohexenyl. A cycloalkyl-lower alkyl or cycloalkenyl-lower alkyl radical $R_2$ is one of the above-mentioned lower alkyl groups, preferably such with up to 4 carbon atoms, having in any position thereof, preferably at the terminal carbon atom, one of said cycloalkyl or cycloalkenyl radicals attached, e.g. cyclopropylmethyl, 2-cyclopenyethyl or 3-cyclopentenylmethyl.

The phenylene radical Ph, carrying the tertiary amino group

in the 2-, preferably 3- or especially 4-position, is unsubstituted or substituted in the remaining positions by one or more than one, preferably one or two, of the same or different substituents selected, for example, from lower alkyl, e.g. methyl, ethyl, n- or i-propyl or -butyl, free etherified or esterified hydroxy or mercapto, such as lower alkoxy or lower alkylmercapto, e.g. methoxy, ethoxy, n- or i-propoxy or -butoxy, methylmercapto or ethylmercapto, or halogeno, e.g. fluoro, chloro, bromo or iodo; trifluoromethyl, nitro, amino, preferably di-lower alkyl-amino or another

group or lower alkanoylamino, e.g. dimethylamino, N-methyl-N-ethylamino, diethylamino, di-n- or i-propyl amino or -butylamino; acetylamino or pivaloylamino, furthermore cyano, carbamoly, di-lower alkylcarbamoyl, carboxy, laower alkylsulfonyl, sulfo, sulfamoyl or di-lower alkylsulfamyl, e.g. N,N-dimethylcarbamoyl or -sulfamoyl, methyl- or ethylsulfonyl. More particularly, the phenylene radical Ph especially represents 1,3- or 1,4-phenylene, but also (lower alkyl)-1,3- or 1,4-phenylene, (lower alkoxy)-1,3- or 1,4-phenylene, mono- or di-(halogeno)-1,3- or 1,4-phenylene, (trifluoromethyl)-1,3- or 1,4-phenylene, (nitro)-1,3- or 1,4-phenylene, (amino)-1,3- or 1,4-phenylene, (di-lower alkylamino)-1,3- or 1,4-phenylene or

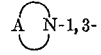

or 1,4-phenylene.

The cyclic tertiary amino group

is, for example, a mono- or bicyclic lower alkyleneimino or preferably lower alkenyleneimino group, the latter containing in the monocyclic portion one, or in the bicyclic portion 1–3 double bonds, e.g. ethyleneimino, pyrrolidino, piperidino, 1,4-pentyleneimino, 2,5- or 1,6- hexyleneimino, 2,6- or 1,7-heptyleneimino; 2-aza-2-bicyclo[2,2,1]heptyl, 2-aza-2-bicyclo[2,2,2] or [3,2,1]octyl, 3-aza-3-bicyclo[3,2,1] or [3,3,0]octyl, 2-aza-2-bicyclo[3,2,2] or [3,3,1]nonyl, 3-aza-3-bicyclo[3,2,2] or [3,2,1]nonyl, 2-aza-2-, 3-aza-3-, 7-aza-7- or 8-aza-8-bicyclo[4,3,0]nonyl or 2-aza-2- or 3-aza-3-bicyclo[4,4,0]decyl; 3-pyrrolino, 3-piperideino, 1,4-pent-2-enyleneimino, 2,5- or 1,6-hex-3-enyleneimino, 2,6- or 1,7-hept-3-enyleneimino; 4,5,6,7-tetrahydroindolino or -isoindolino, 1,7-dihydroindolino or -isoindolino, indolino, isoindolino, 1,2,3,4,5 6,7,8-octahydro-, 1,2,3,4,5,8-hexahydro- or 1,2,3,4-tetrahydroquinolino or -isoquinolino; monocyclic monoaza-, monooxa- or monothia-lower alkyleneimino or N-(lower alkyl, hydroxylower alkyl, H-Ph-lower alkyl or H-Ph)-monoaza-lower alkyleneimino, wherein 2 heteroatoms are separated by at least 1 carbon atom, e.g. piperazino, 4-(methyl, ethyl, 2-hydroxyethyl, benzyl or phenyl)-piperazino, 3-aza-1,7 - heptyleneimino, 3-(methyl or ethyl)-4-aza-1,7-heptyleneimino, morpholino, 3,5-dimethyl-morpholino, tetrahydro-1,3-oxazino or thiamorpholino. Said cyclic tert. amino groups may be unsubstituted or substituted as shown for Ph above, especially by free, etherified or esterified hydroxy or mercapto, e.g. lower alkoxy or alkanoyloxy, or oxo.

Therapeutically acceptable functional derivatives of the acids of Formula I are preferably their esters, for example, their lower alkyl, lower alkenyl, 3 to 7 ring-membered cycloalkyl, cycloalkenyl, cycloalkyl-lower akyl or cycloalkenyl-lower alkyl, aryl or aralkyl esters, e.g. the HPh or HPh-lower alkyl esters, free or etherified hydroxy-lower alkyl, e.g. lower alkoxy- or 3 to 17 ring-membered cyclo-alkoxy-lower alkyl or tert. amino-lower alkyl esters, of which the esterifying moiety has been exemplified above and if it contains hetero atoms, these are separated from each other and the carboxy oxygen by at least 2, preferably 2 or 3 carbon atoms. A tertiary amino group therein is for example di-lower alkylamino or lower alkyleneimino, e.g. dimethylamino, diethylamino, pyrrolidino or piperidino, or monoaza-, monooxa- or monothia-lower alkyleneimino, such as piperazino, 4-lower alkyl-piperazino, e.g. 4-(methyl or ethyl)-piperazino, morpholino or thiamorpholino. Other functional derivatives of the acids of Formula I are, for example, unsubstituted or substituted amides or thioamides, e.g. mono- or di- lower alkylamides, HPh-amides, HPh-lower alkylamides, monocyclic lower alkyleneamides, monoaza-, monooxa- or monothia-lower alkyleneamides, furthermore the corresponding thioamides, hydroxamic acids, nitriles, ammonium or metal salts. Amino derivatives are the N-oxide, lower alkyl- or HPh-lower alkyl quaternaries and acid addition salts.

The compounds of the invention possess valuable pharmacological properties. For example, they exhibit antiinflammatory effects, as can be demonstrated in animal tests, using advantageously mammals, such as rats, as test objects. Such tests can be performed, for example, according to Winter et al., Proc. Soc. Exp. Biol. & Med. 111, 544 (1962). According to it, the compounds of the invention are applied, in the form of aqueous solutions or suspensions, which may contain carboxymethylcellulose or polyethylene glycol as solubilizers, by stomach tube to male and female mature rats, in the dosage range between about 0.1 and 75 mg./kg./day, preferably between about 0.5 and 50 mg./kg./day, advantageously between about 1 and 25 mg./kg./day. About 1 hour later 0.06 ml. of a 1% aqueous saline suspension of carrageenin is injected into the rat's left hind paw and 3–4 hours subsequently any anti-inflammatory activity can be expressed by the difference of the volume and/or weight of the edematous left paw and that of the right paw, as compared with said difference estimated from untreated control animals. According to the adjuvant arthritis test, male rats are sensitized with 0.05 ml. of said 1% carrageenin suspension, applied under ether anesthesia to all four paws. After 24 hours 0.1 ml. of a 1% suspension of M. butyricum is injected intradermally into the tail and 7 days later the compounds of the invention are applied as shown above for a 14 day period. The rats are weighed once weekly and the secondary arthritic lesions scored 3 times a week as to number and severity. The results obtained are compared with those of untreated arthritic rats. In view of the test results obtained, the compounds of the invention are useful antiinflammatory agents in the treatment or management of arthritic and dermatopathologic conditions. They are also useful intermediates in the preparation of other valuable products, preferably of pharmacologically active compounds.

Preferred compounds of the invention are those of Formula I in which:

(a) $R_1$ is hydrogen or lower alkyl, $R_2$ is hydrogen, lower alkyl or lower alkenyl, Ph is unsubstituted phenylene or phenylene substituted by one or two members selected from the group consisting of lower alkyl, hydroxy, mercapto, lower alkoxy, lower alkyl-mercapto, halogeno, trifluoromethyl, nitro, amino, di-lower alkylamino,

lower alkanoylamino, cyano, carbamoyl, di-lower alkylcarbamoyl, carboxy, lower alkylsulfonyl, sulfo, sulfamoyl or di-lower alkyl-sulfamoyl, and the group

is mono- or bicyclic lower alkyleneimino or monocyclic monoaza-, monooxa- or monothia-lower alkyleneimino or N-(lower alkyl, hydroxy-lower alkyl, HPh-lower alkyl or HPh)-monoaza-lower alkyleneimino, wherein 2 heteroatoms are separated by at least 1 carbon atom;

(b) $R_1$, $R_2$ and Ph have the meaning given under item (a) and the group

is monocyclic 5 to 7 ring-membered lower 2- or 3-alkenyleneimino or bicyclic alkenyleneimino containing 5 or 6-membered rings and 1–3 double bonds, which imino groups are unsubstituted or substituted by one or two oxo groups;

(c) $R_1$, $R_2$ and Ph have the meaning given under item (a) and the group

is monocyclic lower alkyleneimino substituted by one or two members selected from the group consisting of hydroxy, mercapto, lower alkoxy, lower alkylmercapto, halogeno, lower alkanoyloxy or oxo;

(d) $R_1$, Ph and

have the meaning given under items (a), (b) and (c), and $R_2$ is 3 to 7 ring-membered cycloalkyl, cycloalkenyl, cycloalkyl-lower alkyl or cycloalkenyl-lower alkyl, or a lower alkyl ester, lower alkenyl ester, 3 to 7 ring-membered cycloalkyl ester, cycloalkenyl ester, cycloalkyl-lower alkyl ester, cycloalkenyl-lower alkyl ester, HPh-ester, HPh-lower alkyl ester, hydroxy-lower alkyl ester, lower alkoxy-lower alkyl ester, di-lower alkylamino-lower alyl ester or

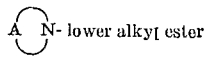

in which esters of 2 hetero atoms are separated from each oher by at least 1, preferably 2 carbon atoms, the amide, thioamide, a mono- or di-lower alkylamide, mono- or di-lower alkyl-thioamide, lower alkyleneamide, lower alkylene-thioamide, HPh-amide, HPh-thioamide, HPh-lower alkylamide, HPh-lower alkylthioamide, morpholide, thiamorpholide or hydroxamic acid, the N-oxide, a lower alkyl quaternary, HPh-lower alkyl quaternary or a therapeutically useful salt of the compounds listed under items (a) to (d).

Particularly useful are the compounds of Formula I, in which:

(e) $R_1$ is hydrogen, $R_2$ is hydrogen or lower alkyl, Ph is 1,3- or 1,4-phenylene, (lower alkyl)-1,3- or 1,4-phenylene, (lower alkoxy)-1,3- or 1,4-phenylene, mono- or di-(halogeno)-1,3- or 1,4-phenylene, (trifluoromethyl)-1,3- or 1,4-phenylene, (nitro)-1,3- or 1,4- phenylene, (amino)-1,3- or 1,4-phenylene, (di-lower alkylamino)-1,3- or 1,4-phenylene or

-1,3- or 1,4-phenylene, the group

is monocyclic lower alkyleneimino, monoaza-, monooxa- or monothia-lower alkyleneimino or N-(lower alkyl), hydroxylower alkyl, HPh-lower alkyl or HPh)-monoazo- lower alkyleneimino, wherein 2 heteroatoms are separated by at least 2 carbon atoms;

(f) $R_1$, $R_2$ and Ph have the meaning given under item (e) and the group

is monocyclic 5 to 7 ring-membered lower 2- or 3-alkenyl- eneimino or bicyclic alkyleneimino containing 5 or 6- membered rings and 1–3 double bonds in the isocyclic ring;

(g) $R_1$, $R_2$ and Ph have the meaning given under item (e) and the group

is monocyclic 5 or 6 ring-membered mono- or di(hydroxy or oxo)-alkyleneimino;

(h) $R_1$, Ph and

have the meaning given under items (e), (f) and (g), and $R_2$ is 3 to 7 ring-membered cycloalkyl or cycloalkyl- lower alkyl, or a lower alkyl ester, the amide, a mono- or di-lower alkylamide, the ammonium salt, an alkali metal or alkaniline earth metal salt or a therapeutically useful acid addition salt of the compounds listed under items (e) to (h).

Outstanding are the compounds of Formula

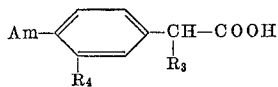

in which:

(i) $R_3$ is hydrogen or alkyl with up to 4 carbon atoms, $R_4$ is hydrogen, alkyl or alkoxy with up to 4 carbon atoms, halogeno, trifluoromethyl, nitro or amino, and Am is monocyclic 5 to 7 ring-membered lower alkylene- imino or 6 ring-membered monoazo-, monooxa- or monothia-lower alkyleneimino wherein 2 heteroatoms are separated by at least 2 carbon atoms;

(j) $R_3$ and $R_4$ have the meaning given under item (i), and Am is 3-pyrrolino, 3-piperideino, 1,6-hex-3-enyleneimino, indolino, isoindolino or 1,2,3,4-tetrahydro- quinolino or- isoquinolino;

(k) $R_3$ and $R_4$ have the meaning given under item (i) and Am is (3-hydroxy or 2-oxo)-pyrrolidino, (3,4-di- hydroxy or 2,5-dioxo)-pyrrolidino, (3- or 4-hydroxy or 2-oxo)-piperidino or (3,4 - dihydroxy or 2,6 - dioxo)- piperidino;

(l) $R_4$ and Am have the meaning given under items (i), (j) and (k), and $R_3$ is 3 or 4 ring-membered lower cycloalkyl or cycloalkylmethyl, or the methyl, ethyl, n- or i-propyl or -butyl ester, the ammonium, sodium or potassium salt or a therapeutically useful acid addition salt of the compounds listed under items (i) to (l).

Especially valuable are compounds of the Formula II, in which:

(m) $R_3$ is hydrogen or methyl, $R_4$ is hydrogen, chloro, nitro or amino, and Am is pyrolidino, piperidino, 1,6-hexyleneimino, 1,7-heptyleneimino, 4-methyl-piperazino or morpholino;

(n) $R_3$ and $R_4$ have the meaning given under item (m), and Am is 3-pyrrolino or isoindolino;

(o) $R_3$ and $R_4$ have the meaning given under item (m), and Am is 3- or 4-hydroxypiperidino or 2-oxopyr- rolidino;

(p) $R_4$ and Am have the meaning given under items (m), (n) and (o), and $R_3$ is cyclopropyl or cyclopropyl- methyl, the methyl or ethyl ester, the ammonium, sodium or potassium salt or a therapeutically useful acid addition salt of the compounds listed under items (m) to (p).

The most preferred embodiments of the present invention are the compounds listed under items (b), (d), (f), (h), (j), (l), (n) and (p), which exhibit in the above described test systems at doses between about 1 and 25 mg./kg./day a high order of anti-inflammatory activity.

The compounds of this invention are prepared according to methods known per se. For example, they are obtained by:

(a) converting in a compound of the Formula III

 (III)

in which $X_1$ is a substituent capable of being converted into the free or functionally converted

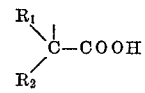

moiety, $X_1$ into said acid group or (b) converting in a compound of Formula IV

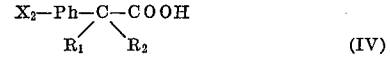 (IV)

or a functional derivative thereof, in which $X_2$ is a substituent capable of being converted into

$X_2$ into said cyclic tert. amino group and, if desired, converting any resulting compound into another compound of the invention.

According to process (a), the compounds of the invention are prepared either by (α) introduction of the whole free or functionally converted acid moiety

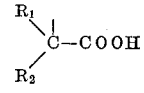

or any part thereof (preferably the carboxylic function), into compounds of Formula III, or by (β) liberation of said acid moiety from a suitable group containing already the required number of carbon atoms, i.e. the liberation of a potential carboxy or alkylidene moiety.

Accordingly, the simplest substituent $X_1$ is a hydrogen atom, a metallic group or a reactively esterified hydroxy group. The former is, for example, an alkali metal, e.g. a lithium atom, or a substituted alkaline earth metal, zinc or cadmium atom, such as halomagnesium or lower alkyl zinc or cadmium, e.g. chloro-, bromo- or iodo- magnesium, methyl or ethyl zinc or cadmium. A reactively esterified hydroxy group is preferably such derived from a strong mineral or sulfonic acid, such as a hydrohalic, sulfuric, lower alkane or benzene sulfonic acid, e.g. hydrochloric, hydrobromic, methane-, ethane-, benzene- or p-toluenesulfonic acid. The corresponding starting material of Formula III is reacted with the acid having the formula

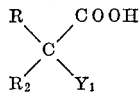

or a suitable derivative, e.g. a corresponding salt, ester, amide or nitrile thereof, in which formulae one of $X_1$ and $Y_1$ is the above-described metallic group and the other said reactively esterified hydroxy group, or $X_1$ is hydrogen and $Y_1$ is a free or reactively esterified hydroxy group. Such reaction is performed according to the classical Grignard or Friedel-Crafts syntheses, in which a new carbon-carbon bond is formed from separate reactants. The latter synthesis is performed in the presence of a Lewis acid, such as an aluminum, boron, antimony V, ferric or zinc salt, e.g. the chlorides thereof, or hydrofluoric, sulfuric or preferably polyphosphoric acid, which latter agent is advantageously used with the above glycolic acids or their derivatives, i.e. those in which $Y_1$ is hydroxy. In case $X_1$ is a hydrogen atom and Ph contains a free or functionally converted γ-carboxy-2-alkenyloxy group in the ortho or para position thereto, such allyl ether starting material, e.g. that of the formula

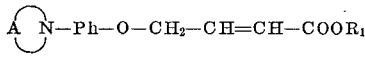

can be rearranged according to the Claisen (Cope) rearrangement procedure, for example, by heating it up to about 300° or less, to yield compounds of Formula I in which $R_3$ is lower alkenyl and Ph contains a hydroxy group ortho or para to the acid moiety, or functional acid derivatives, e.g. esters or lactones, thereof.

The substituent $X_1$ in Formula III is also the group

in which $Y_2$ is a metallic group, e.g. such mentioned above, an ammonium group, such as tri-lower alkylammonium or di-lower alkyl-aralkylammonium, e.g. trimethylammonium or dimethylbenzylammonium, or a free or reactively converted, such as esterified, etherified or salified, hydroxy group, e.g. such esterified as mentioned above, or etherified with a lower alkanol or aralkanol, or salified with an alkali or alkaline earth metal, e.g. sodium, potassium or calcium. Such metal compound, ester, ether or alcoholate of Formula III is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a corresponding carbonate or haloformate, e.g. diethyl carbonate or thiocarbonate; ethyl or propyl orthocarbonate; ethyl, tert. butyl, allyl, 2-methoxyethyl, 3-chloropropyl, phenyl or benzyl chloroformate; cyanogen or carbamoyl halides, e.g. cyanogen bromide or diethylcarbamoyl chloride. The starting material, in which $Y_2$ is an ammonium or free or reactively converted hydroxy group, is advantageously reacted with a metal cyanide, e.g. sodium or potassium cyanide, and that in which $Y_2$ is free, esterified or salified hydroxy, or the dehydrated unsaturated derivative thereof (wherein $X_1$ is a corresponding 1-alkenyl group), can also be reacted with carbon monoxide. The latter may be applied under neutral, basic or acidic conditions respectively, e.g. in the presence of sulfuric acid, under high pressure and/or temperature, e.g. up to 400 at and 300°, advantageously in the presence of heavy metal catalysts, e.g. nickel or cobalt salts or carbonyl derivatives thereof. The carbon monoxide may also be generated from appropriate sources, such as formic acid and high boiling mineral acids, e.g. sulfuric or phosphoric acid.

Another substituent $X_1$ is the group

wherein $Y_3$ is a substituent convertible into a free or functionally converted carboxy group. The conversion of $Y_3$ into the latter group can be performed either by oxidation or rearrangement. In the former case $Y_3$ is, for example, methyl, hydroxymethyl, borylmethyl, hydroxyiminomethyl, formyl, lower 1-alkenyl or 1-alkynyl, lower 1,2-dihydroxyalkyl or acyl, such as lower alkanoyl, alkenoyl, free or esterified carboxycarbonyl. In the corresponding starting material of Formula III, containing said potential carboxy function, $Y_3$ is transformed into free or functionally converted carboxy according to standard oxidation methods, for example, with the use of air or pure oxygen, preferably in the presence of catalysts, such as silver, manganese, iron or cobalt catalysts, or with oxidation agents, e.g. hydrogen peroxide or nitric oxides, oxidizing acids or their salts, such as hypohalous, periodic, nitric or percarboxylic acids or suitable salts thereof, e.g. sodium hypochlorite or periodate, peracetic, perbenzoic or monoperphthalic acid, heavy metal salts or oxides, such as alkali metal chromates or permanganates; chromic or cupric salts, e.g. halides or sulfates thereof, or silver, mercuric, vanadium V, chromium VI or manganese IV oxide, in acidic or alkaline media respectively. In said oxidations, usually the free carboxylic acids of Formula I, or salts thereof, are obtained. However, by subjecting, for example, a hydroxyiminomethyl compound (oxime) to Beckmann rearrangement, e.g. treatment with sulfuric acid, p-toluenesulfonyl chloride or phosphorus pentachloride, or to oxidation, e.g. with hydrogen peroxide or any of said percarboxylic acids, or reacting the corresponding formyl or acyl compound (aldehyde or ketone) with hydrazoic acid according to the Schmidt reaction, e.g. in the presence of sulfuric acid, or the aldehyde with a sulfonyl- or nitro-hydroxamate, a nitrile, amide or hydroxamic acid will be formed respectively. A starting material in which $Y_3$ is free or esterified carboxycarbonyl, e.g. lower carbalkoxycarbonyl, can be converted into the acid of Formula I either by oxidation, e.g. with hydrogen peroxide in acidic media, such as mineral acids, or by decarbonylation, which preferably is carried out by pyrolysis, advantageously in the presence of copper or glass powder.

Finally, the substituent $X_1$ in Formula III may be such a moiety, which primarily is capable of liberating the required alkylidene group

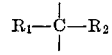

Such moiety is, for example, the free or functionally converted group

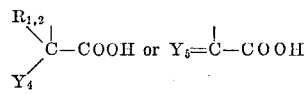

wherein each of $Y_4$ or $Y_5$ are convertible into $R_1$ and/or $R_2$ respectively, for example, by reduction, decarboxylation, deacylation or desulfurization. For example, $Y_4$ is a free or reactively esterified or etherified hydroxy or mercapto group as mentioned above, e.g. hydroxy, mercapto, chloro, bromo, iodo, benzyloxy or benzylmercapto, and $Y_5$ a lower alkylidene, cycloalkylidene, cycloalkylalkylidene, oxo or thiono group. The corresponding starting material, or the quaternary o- or p-quinonmethides thereof, obtainable by splitting off $Y_4H$ from said compounds of Formula III, in which at least one of $R_1$ and $R_2$ is hydrogen, e.g. with the use of strong mineral acids or alkalis, can be reduced either with catalytically activated or nascent hydrogen, such as hydrogen in the presence of nickel, palladium or platinum catalysts, or with hydrogen generated by electrolysis or the action of metals on acids, alkalis or alcohols, such as zinc, amalgamated zinc, iron or tin on aqueous mineral or carboxylic acids, e.g. hydrochloric or acetic acid, zinc or aluminum-nickel alloys on aqueous alkali metal hydroxides, or sodium, potassium or their amalgams on lower alkanols. Also reducing and/or desulfurizing agents may be applied, depending on the starting material chosen. In case $Y_4$ is hydroxy, the reducing agent may be an aqueous suspension of phosphorus and iodine, hydriodic acid, stannous chloride or sodium sulfite or dithionite, or in case $Y_4$ is esterified hydroxy, e.g. halogeno, an aliphatic or cycloaliphatic metal compound, e.g. a corresponding $R_1$ or $R_2$ lithium or Grignard compound may be used as reducing agent. The latter metal compounds may also be applied in the reduction of said quinonmethides. In case $Y_5$ is oxo, the Clemmensen, Wolff-Kishner or Huang-Minlon procedures may be applied, wherein nascent hydrogen or hydrazine are used, the latter advantageously in the presence of strong alkalis, e.g. high boiling aqueous or glycolic sodium or potassium hydroxide solutions. In the reduction of mercapto, free or ketalized thiono compounds, desulfurization agents are advantageously applied, such as mercury or copper oxide or Raney nickel. In case $Y_4$ represents carboxy, the corresponding malonic acid derivative is decarboxylated by pyrolysis, advantageously in acidic media, or $Y_4$ stands for another acyl radical, such as lower alkanoyl or aralkanoyl, e.g. acetyl or benzoyl, the β-keto acid is subjected to acid splitting by the action of strong alkalis, e.g. those mentioned above.

Another substituent $X_1$, also providing said alkylidene group, is an unsubstituted or substituted acetyl group, e.g.

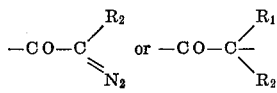

halogen. The corresponding unsubstituted acetyl starting material is converted into the compounds of the invention according to the Willgerodt-Kindler reaction, e.g. by the action of sulfur in the presence of ammonia, primary or secondary amines and advantageously of sulfonic acids, e.g. p-toluene sulfonic acid, and said substituted acetyl compounds according to the Wolff (Arndt-Eistert) reaction, e.g. by hydrolysis, alcoholysis, ammonolysis or aminolysis of corresponding α-diazoketones, advantageously while irradiated or heated in the presence of copper or silver catalysts, or according to the Favorskii (Wallach) reaction respectively, e.g. by the action of strong alkalis or soluble silver salts, such as silver nitrate, on corresponding α-haloketones.

According to process (b), the cyclic tertiary amino group

is either (α) introduced into the phenylene moiety Ph, or (β) a primary, secondary or acyclic (open) tertiary amino group, present therein, converted into the desired cyclic tertiary amino group. Accordingly, $X_2$ is, for example, a hydrogen atom, a metallic group or a free or reactively esterified hydroxy group, e.g. those groups shown above, preferably an alkali metal or halogen atom respectively. The corresponding starting material of Formula IV is reacted with the compound

in which one of $X_2$ and $Y_1$ is hydrogen or said metallic group, e.g. lithium or sodium, and the other said free or reactively esterified hydroxy group, e.g. fluorine or chlorine. In case $X_2$ is hydrogen and $Y_1$ halogen, the reaction is carried out analogous to the Friedel-Crafts syntheses mentioned above, i.e. in the presence of Lewis acids or, in case $Y_1$ is hydroxy, in the presence of alkalis, e.g. potassium hydroxide. In case $X_2$ is hydroxy or lower alkanoyloxy, the reaction is advantageously carried out in the presence of a dehydration or dehydrogenation catalyst, such as a mineral acid or a salt thereof, e.g. hydrochloric acid, ammonium sulfite or sodium bisulfite, activated aluminum oxide, Raney nickel or palladium-charcoal.

The conversion of any primary, secondary or acyclic tertiary amino group $X_2$ into

can simply be performed by transamination with the amine

The latter is advantageously used in excess and in the presence or absence of catalysts, e.g. the above mentioned dehydration or dehydrogenation catalysts, and elevated temperature and/or pressure. A starting material of Formula IV, in which $X_2$ is primary amino, can also be reacted with the glycol, glycolic acid or dicarboxylic acid HO—A—OH, or advantageously a reactive functional derivative thereof, such as an ester, cyclic ether or the dehydrated, unsaturated (olefinic) derivative of said glycol or glycolic acid and/or a halide, anhydride or lactone of the acid, e.g. such mentioned above. These condensations are advantageously carried out in the presence of water or acid binding agents, such as alkali metal carbonates, and the addition of the unsaturated compounds to the amino group preferably in the presence of catalysts, e.g. copper, cobalt or molybdenum catalysts, alkali metals or their hydroxides. Finally, an acyclic tertiary amino group $X_2$ can be ring-closed to the

group, for example, by dehydration, dehydrosulfidation or amination of bis-(hydroxy or mercaptoalkyl)-amino group to form an oxa-, thia- or aza-alkyleneimino group. The former is preferably carried out with the use of concentrated mineral or sulfonic acids, Lewis acids or carboxylic acid anhydrides, e.g. hydrobromic, sulfuric, phosphoric or p-toluenesulfonic acid or acetic anhydride. Preferably reactive esters of the latter starting material are cyclized, either with the use of metal oxides, sulfides or alcoholates, e.g. such of alkali or alkaline earth metals, to yield the oxa- or thiaalkyleneimino compounds, or with ammonia or corresponding primary amines, to yield the azaalkyleneimino compounds of Formula I, or preferably acid derivatives thereof.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, halides or oxyhalides or other acyl halides, in order to obtain the corresponding esters, halides, anhydrides, amides or the nitrile respectively. Resulting amides or thioamides (Willgerodt) can be hydrolyzed under acidic or alkaline conditions, e.g. with the use of aqueous mineral and/or carboxylic acids or alkali metal hydroxides, also alcoholyzed, transaminated or desulfurized, e.g. with the use of mercuric oxide or alkyl halides followed by hydrolysis. Resulting nitriles likewise can be hydrolyzed or alcoholyzed, e.g. with the use of concentrated aqueous or alcoholic acids or alkalis or alkaline hydrogen peroxide. A resulting ester, salt or nitrile, containing in α-position at least one hydrogen atom, can be metallized therein e.g. with the use of alkali metals or their derivatives, such as phenyl lithium, triphenylmethyl sodium or sodium hydride, amides or alcoholates, and thereupon reacted with reactive esters of $R_1$—OH and/or $R_2$—OH. Resulting compounds may also be halogenated in the Ph-moiety, e.g. with the use of halogens, which are advantageously applied in the presence of Lewis acids, e.g. ferric, aluminum, antimony III or tin IV halides, or with the use of halogenation agents, e.g. hydrochloric acid and hydrogen peroxide or sodium chlorate, nitrosyl chloride or bromide, bromosuccin- or phthalimide. Furthermore, nitration may be applied to final products, advantageously with the use of nitric acid or nitrates under acidic condition, e.g. in the presence of sulfuric or trifluoroacetic acid respectively. Resulting nitro compounds may be reduced, for example, with catalytically activated or nascent hydrogen and, if desired, the primary amino compounds obtained, either treated with reactive esters of corresponding alcohols or glycols, or with reactive functional acid derivatives, in order to obtain secondary, tertiary, quaternary or acylated amino compounds respectively. Said prim. amines can also be treated with nitrous acid to yield diazonium salts, which latter can be converted according to the Sandmeyer reaction, into the corresponding hydroxy, halogeno, cyano, alkoxy or alkylmercapto compounds, e.g. by hydrolyzing the diazonium salt at elevated temperatures, or reacting it with cuprous halides or cyanide, or with a lower alkanol or alkylmercaptan respectively, preferably under neutral or slightly acidic or alkaline conditions. In resulting phenolic products, the hydroxy or mercapto group can be etherified, e.g. by reacting the corresponding alkali metal phenolates with lower alkyl or cycloalkyl halides or sulfonates, or resulting phenol ethers are hydrolyzed, e.g. with the use of strong acids or acidic salts, e.g. hydrobromic and acetic acid or pyridine hydrochloride. Finally, resulting unsaturated compounds can be hydrogenated as described above, e.g. with catalytically activated or nascent hydrogen, in order to eliminate double bonds, e.g. in the

and/or ester moiety.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid, until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-amino-benzoic, anthranilic, 4-hydroxybenzoic, salicylic, aminosalicylic, embonic, nicotinic, methanesulfonic, ethansulfonic, hydroxy-ethanesulfonic, ethylenesulfonic, benzenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates or d-α-(l-naphthyl)-ethylamine or l-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out, or the process is discontinued at any stage thereof, or in which the starting material is formed under the reaction conditions or is used in the form of its salts or reactive derivatives. For example, in most of the above-described oxidation methods, wherein $Y_3$ is converted into a free or functionally converted carboxy group, the corresponding aldehydes ($Y_3$ is formyl) are formed intermediarily. According to the haloform reaction ($Y_3$ is acetyl) intermediarily formed trihaloketones are hydrolyzed under the applied alkaline conditions, to yield, the corresponding salts or esters of the acids of Formula I. Also, the quaternary o- or p-quinonmethides may be formed intermediarily from the corresponding starting material in which $Y_4$ is free or reactively esterified hydroxy, e.g. under strongly acidic or alkaline conditions, or during the reduction of compounds in which $Y_5$ is oxo or thiono. The α-diazoketones are usually formed, according to Arndt-Eistert, from the corresponding benzoic acid halides and aliphatic or cycloaliphatic ($R_2$) diazo compounds, whereupon the above-described Wolff rearrangement is performed. Moreover, in the formation of the cyclic tert. amino group

several intermediates are formed from the various starting materials mentioned above. For example, in the reaction of compounds of Formula IV, in which $X_2$ is primary amino, with those of the formula HO—A—OH or its reactive functional derivatives, usually secondary amines or amides are formed, wherein $X_2$ is —NH—A—OH, or reactive amino derivatives of such intermediates. Also in the cyclization of compounds, in which $X_2$ is a bis-(hydroxy or mercaptoalkyl)-amino group, various intermediates may be formed, in which both amino-substituents are different, e.g. the one is lower haloalkyl and the other is free or salified lower hydroxy-, mercapto- or aminoalkyl. Finally, in the various reductions mentioned above, especially those of the quinonmethides, overreduction may occur, to yield products of Formula I, or functional derivatives thereof wherein Ph is a corresponding cyclohexylene, cyclohexenylene or cyclohexadienylene radical. Such compounds, which also could be prepared from different sources, can be dehydrogenated either by pyrolysis in the presence of catalysts, e.g. the above-mentioned hydrogenation catalysts, or with the use of dehydrogenation agents, such as sulfur, selenium or derivatives thereof, e.g. dialkylsulfides or selenium dioxide, quinones, e.g. chloranil, and the like. In the process of the invention, those starting materials are advantageously selected, which yield the above-described preferred embodiments of the invention, e.g. the compounds listed under items (b), (d), (f), (h), (j), (l), (n) and (p), especially those corresponding to Formula II.

The starting material used is known or, if new, may be prepared according to the methods described for known analogs thereof. For example, compounds of Formula III can be prepared analogous to the process mentioned under item (b), i.e. by introduction or construction of the cyclic amino group

In case $X_1$ is a reactively esterified hydroxy group, it may also be introduced either by halogenation, or nitration followed by reduction, diazotization and Sandmeyer reaction. The resulting starting material may be subsequently converted into the metallic compounds, e.g. by reaction with alkali or alkaline earth metals, such as lithium or magnesium, or with dialkyl zinc or cadmium. The allyl ethers for the Claisen rearrangement can be prepared analogous to those described in J. Chem. Soc. 4210 (1963).

The starting material in which $Y_2$ is a metallic group may be prepared as shown above, i.e. by reacting reactive esters of the corresponding benzylalcohols with alkali or alkaline earth metals or dialkyl zinc or cadmium. Otherwise, according to Friedel-Crafts, easily obtainable linear or cyclic alkano- or alkenophenones

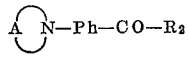

may be reduced either with lithium aluminum hydride or with $R_1$-magensium halides, or

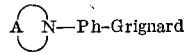

compounds reactive with $R_1$—CO—$R_2$, to yield the corresponding benzyl alcohols, whose hydroxy group may be reactively esterified or salified according to well-known methods, e.g. by reaction with phosphorus, thionyl or sulfonyl halides, alkali or alkaline earth metals respectively and the resulting esters or salts may be converted into ethers either by reaction with alcoholates or reactive esters respectively. The compounds in which $Y_2$ is an ammonium group, can be obtained from the former reactive esters and secondary amines and the resulting tertiary amines are quaternized in the usual manner, e.g. by reaction with lower alkyl or aralkyl halides.

The starting material containing $Y_3$ can be obtained from the former compounds in which $Y_2$ is a metallic group, by reacting them with a methyl halide, formaldehyde, a formyl halide, lower alkanal, alkenal or hydroxyalkanal or a lower alkanoyl, alkenoyl or oxalyl halide respectively and, if desired, dehydrating resulting alcohols by the action of acidic agents, e.g. sulfuric acid or phosphorus pentoxide, to yield unsaturated derivatives thereof. The latter, e.g. methylidene compounds, may be reacted with boranes in order to obtain boryl methyl compounds and aldehydes with hydroxylamine, to yield the hydroxyiminomethyl compounds (oximes). The aldehydes, i.e. compounds in which $Y_3$ is formyl, can also be obtained from said ketones

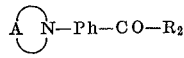

by reaction with dimethylsulfoniummethylide or dimethyloxysulfoniummethylide (generated from the corresponding trimethylsulfonium salts) and rearranging the resulting ethyleneoxides to the corresponding aldehydes by the action of Lewis acids, e.g. p-toluene sulfonic acid or boron trifluoride, or according to the Darzens condensation by reacting the above ketones with α-halo-alkanoic or alkenoic acid esters in the presence of alcoholates, e.g. potassium tert. butoxide, saponifying the glycidic esters formed and rearranging and decarboxylating them, advantageously in acidic media, e.g. sulfuric acid.

The starting material containing $Y_4$, which represents free, esterified or etherified hydroxy or mercapto, can be prepared according to the cyanohydrin or analog syntheses, e.g. by reaction of compounds

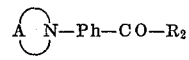

or their thiono analogs, with aqueous potassium cyanide under acidic conditions and, if desired, converting resulting nitriles into other acid derivatives and/or alcohols into corresponding mercapto compounds or reactive esters or ethers thereof, or dehydrating them to unsaturated derivatives. The compounds in which $Y_5$ is oxo or thiono can be obtained according to Friedel-Crafts with the use of suitable

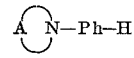

compounds and oxalyl halides. The resulting phenylglyoxylic acid esters may then be reduced with $R_2$-Grignard compounds, if desired, followed by dehydration. Said compounds may also be prepared according to the Ando synthesis by reaction with mesoxalates in the presence of stannic chloride. The resulting adduct can either be hydrogenated, the malonate formed metallized and reacted with a reactive ester of $R_2$—OH or saponified and decarboxylated.

Finally the α-diazoketones are obtained from corresponding benzoic acid halides and $R_2$-diazo compounds and the α-haloketones by halogenating of the corresponding alkanophenones or reacting the former α-diazoketones with hydrohalic acids. The starting material of Formula IV is prepared analogous to the process mentioned under item (a), by selecting starting materials containing $X_2$ or a group capable of being converted into $X_2$, advantageously nitro, instead of

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50% of the active ingredient.

The following examples are intended to illustrate the invention and are not to be construed as being limitations

EXAMPLE 1

The mixture of 8.53 g. 4-piperidino-acetophenone, 7.5 g. sulfur, 6 ml. pyridine and 10 ml. saturated aqueous ammonia is heated in a sealed tube to 165° for 5 hours. After cooling, it is poured into water, the mixture boiled with charcoal and filtered hot. The filtrate is concentrated in vacuo and the precipitate formed after cooling is filtered off and recrystallized from ethanol, to yield the (4-piperidino-phenyl)-acetamide of the formula

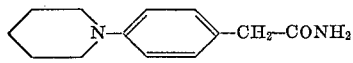

melting at 172–175°.

The starting material is prepared as follows: The mixture of 202 g. 4-fluoro-acetophenone, 255 g. piperidine and 450 ml. dimethylsulfoxide is heated at the steam cone for 48 hours. After cooling it is poured into ice water, the precipitate formed filtered off and recrystallized from hexane, to yield the 4-piperidino-acetophenone melting at 85–86°.

EXAMPLE 2

The mixture of 45 g. 4-piperidino-acetophenone, 200 ml. morpholine, 8.5 g. sulfur and 2 g. p-toluene sulfonic acid is refluxed for 17 hours while stirring. It is evaporated in vacuo and the residue recrystallized from ethanol, to yield the (4-piperidino-phenyl)-thioacetmorpholid of the formula

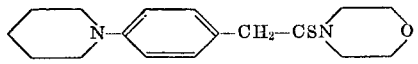

melting at 156–158°.

By concentrating the mother liquor, another precipitate is formed, which is filtered off and recrystallized from isopropanol, to yield a small amount of (4-piperidino-phenyl)-monothioglyoxylic acid morpholid melting at 140–144°.

EXAMPLE 3

To the solution of 10 g. (4-piperidino-phenyl)-thioacetmorpholid in 300 ml. acetone, 25 ml. methyl iodide are added dropwise while stirring and the mixture is refluxed for 3½ hours. It is cooled, filtered, and the residue dissolved in the minimum amount of morpholine. The solution is heated at the steam bath until the evolution of methylmercaptan ceases. It is evaporated in vacuo, the residue taken up in water and the mixture heated at the steam cone for 10 minutes. It is cooled, extracted with chloroform, the extract dried, filtered and evaporated. The residue is recrystallized from diethyl etherhexane, to yield the (4-piperidino-phenyl)-acetmorpholid of the formula

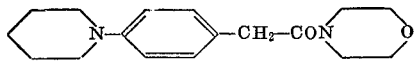

melting at 99–103°.

EXAMPLE 4

The mixture of 42 g. (4-piperidino-phenyl)-thioacetmorpholid and 250 ml. concentrated hydrochloric acid is slowly heated to reflux and refluxed for 3 hours. It is evaporated in vacuo, the residue triturated with chloroform and recrystallized from isopropanol, to yield the (4-piperidino-phenyl)-acetic acid hydrochloride of the formula

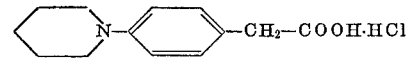

melting at 189–193°.

EXAMPLE 5

The mixture of 30 g. (4-piperidino-phenyl)-acetic acid hydrochloride and 100 ml. saturated ethanolic hydrochloric acid is refluxed for 17 hours and evaporated in vacuo. The residue is taken up in water, the mixture washed with diethyl ether, the aqueous layer separated and made basic with aqueous sodium hydroxide. The mixture is extracted with diethyl ether, the extract dried and gassed with hydrogen chloride. The precipitate formed is filtered off, to yield the ethyl (4-piperidino-phenyl)-acetate hydrochloride of the formula

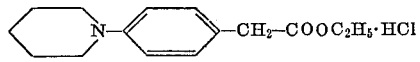

melting at 160–162°.

EXAMPLE 6

The solution of 14.2 g. ethyl (4-piperidino-phenyl)-acetate hydrochloride in the minimum amount of water is made basic with aqueous sodium hydroxide and extracted with diethyl ether. The extract is dried, filtered, the filtrate concentrated to 15 ml. and added dropwise to the solution of 20 g. sodium amide in 350 ml. liquid ammonia while stirring. Hereupon the solution of 7.1 g. methyl iodide in 25 ml. diethyl ether is added dropwise during 25 minutes and the mixture stirred for 1½ hours. Hereupon water and diethyl ether are added and the mixture allowed to stand overnight. The organic phase is separated, the aqueous layer extracted with diethyl ether, the combined organic solutions dried, filtered and the filtrate gassed with hydrogen chloride. The precipitate formed is filtered off and recrystallized from acetone, to yield the ethyl-α-(4-piperidino-phenyl)-propionate hydrochloride of the formula

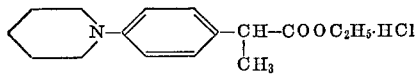

melting at 190–192°.

EXAMPLE 7

The mixture of 70 g. 4-pyrrolidino-acetophenone, 250 ml. morpholine, 13.5 g. sulfur and 3 g. p-toluene sulfonic acid is refluxed for 17 hours while stirring. It is evaporated in vacuo and the residue recrystallized from ethanol to yield the (4-pyrrolidino-phenyl)-thioacetmorpholid of the formula

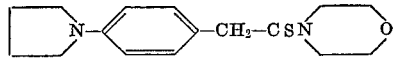

melting at 168–171°.

EXAMPLE 8

The mixture of 50 g. 4-morpholino-acetophenone, 200 ml. morpholine, 9 g. sulfur and 2.5 g. p-toluene sulfonic acid is refluxed for 15 hours. It is concentrated in vacuo and the residue recrystallized from acetone to yield the (4-morpholinophenyl)-thiocetmorpholid of the formula

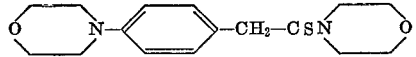

melting at 164–166°.

EXAMPLE 9

The mixture of 32.9 g. methyl (4-amino-phenyl)-acetate, 48 g. 1,5-dibromo-pentane, 54 g. N,N-diisopropyl-N-ethylamine and 100 ml. methylene chloride is alowed to stand for 2½ days at room temperature and is finally refluxed for 6 hours. After cooling, 200 ml. toluene are added, the mixture filtered and the filtrate evaporated in vacuo. The residue is chromatographed on 200 g. silica gel and eluated with toluene. The first fractions are collected and evaporated, to yield the methyl (4-piperidino-phenyl)-acetate of the formula

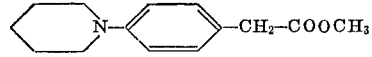

having an $R_f$ value of 0.61 in the thin layer chromatogram using silica gel as the stationary phase and benzene: acetone (9:1) as the mobile phase.

After acidic saponification, analogous to the method described in Example 4, the corresponding free acid hydrochloride is obtained, which is identical with the product of that example.

EXAMPLE 10

The mixture of 5 g. ethyl α-(4-piperidino-phenyl)-propionate hydrochloride and 100 ml. 25% aqueous sodium hydroxide is refluxed until dissolution is complete. It is cooled, acidified with hydrochloric acid and evaporated in vacuo. The residue is taken up in ethanol, the solution treated with charcoal, filtered and the filtrate evaporated. The residue is recrystallized from isopropanol-diethyl ether, to yield the α-(4-piperidino-phenyl)-propionic acid hydrochloride of the formula

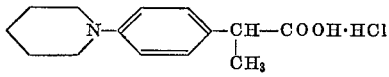

melting at 211–214°.

EXAMPLE 11

The mixture of 72 g. (4-morpholino-phenyl)-thioacetmorpholid and 200 ml. concentrated hydrochloric acid is refluxed for 2 hours and allowed to stand overnight at room temperature. It is evaporated in vacuo, the residue taken up in 100 ml. water and the solution neutralized with N-aqueous sodium bicarbonate to a pH of 3–4. The precipitate formed is filtered off and recrystallized from ethanol-diethyl ether, to yield the (4-morpholino-phenyl)-acetic acid of the formula

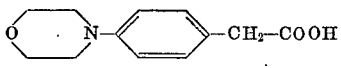

melting at 111–113°.

EXAMPLE 12

In the manner described in the previous examples, the following compounds are prepared:
(Ia) (4-hexamethyleneimino-phenyl)-thioacetmorpholid, M.P. 127–129°, (b) (4-hexamethyleneimino-phenyl)-acetic acid hydrochloride, M.P. 148–151°.
(IIa) (4-heptamethyleneimino - phenyl) - thioacetmorpholid, M.P. 122–124°.

EXAMPLE 13

To the solution of 8 g. (3-chloro-4-morpholino-phenyl)-acetonitrile in 100 ml. ethanol, 4 g. potassium hydroxide in 40 ml. water are added and the whole is refluxed for 16 hours. The mixture is evaporated in vacuo, the residue is taken up in 150 ml. water, 0.5 g. charcoal are added and the mixture is filtered. The filtrate is acidified with 2 N hydrochoric acid to a pH of about 3 and extracted with diethyl ether. The extract is washed with water, dried, evaporated and the residue recrystallized from diethyl ether-petroleum ether, to yield the (3-chloro-4-morpholino-phenyl)-acetic acid of the formula

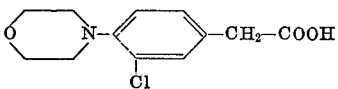

melting at 125–126°.

The starting material is prepared as follows: The mixture of 200 g. 3-nitro-4-chloro-benzoic acid and 400 ml. morpholine is heated to 140° for 5 hours and evaporated in vacuo. The residue is taken up in 4 liters water and 1.5 liter ethanol, and the mixture acidified with 2 N hydrochloric acid to a pH of about 3. The precipitate formed is filtered off and recrystallized from ethanol, to yield the 3-nitro-4-morpholino-benzoic acid melting at 175–176°.

The mixture of 80 g. thereof, 500 ml. methanol and 30 ml. concentrated sulfuric acid is refluxed for 3 hours and evaporated in vacuo. The residue is taken up in water, the mixture made slightly basic with sodium hydroxide and extracted with ethyl acetate. The extract is washed with water, dried, evaporated in vacuo and the residue recrystallized from diethyl ether-petroleum ether, to yield the methyl 3-nitro-4-morpholino-benzoate melting at 97–99°.

The mixture of 96.5 g. thereof, 500 ml. ethanol and 5 g. 10% palladium charcoal is hydrogenated until the theoretical amount of hydrogen is absorbed (about 6 hours). The mixture is diluted with 500 ml. dimethylformamide, heated to the boil and filtered. The filtrate is concentrated in vacuo to about ⅔ of the original volume, cooled, and the precipitate formed filtered off, to yield the methyl 3-amino-4-morpholino-benzoate melting at 189–191°.

The mixture of 82 g. thereof, 500 ml. ethanol, 60 ml. 10 N aqueous sodium hydroxide and 200 ml. water is heated at the steam bath for 3 hours. Hereupon 1 g. charcoal is added, the mixture filtered hot, the filtrate cooled and acidified with concentrated hydrochloric acid to a pH of 3–4. The precipitate formed is filtered off, to yield the 3-amino-4-morpholino-benzoic acid melting at 250–252° with decomposition.

To the mixture of 110 g. thereof and 700 ml. concentrated hydrochloric acid, the solution of 50 g. sodium nitrite in 200 ml. water is added dropwise at 0° while stirring. The solution obtained is added slowly to the stirred solution of 80 g. freshly prepared cuprous chloride in 300 ml. concentrated hydrochloric acid while cooling to keep the temperature between about 10 and 15°. The mixture is stirred for 1 hour at room temperature and is diluted with water. The precipitate formed is filtered off, dissolved in aqueous sodium bicarbonate and the solution treated with charcoal. It is filtered, the filtrate acidified with hydrochloric acid to a pH of 3–4, the precipitate formed filtered off and recrystallized from ethanol, to yield the 3-chloro-4-morpholino-benzoic acid melting at 195–196°.

The mixture of 38 g. thereof, 250 ml. ethanol and 17 ml. concentrated sulfuric acid is refluxed for 1 hour and evaporated in vacuo. To the residue, ice and saturated aqueous potassium carbonate is added until alkaline, and the whole is extracted with diethyl ether. The extract is dried, evaporated and the residue recrystallized from diethyl ether-petroleum ether, to yield the ethyl 3-chloro-4-morpholino-benzoate melting at 75–76°.

The solution of 30 g. thereof in 50 ml. dioxane is added dropwise to the suspension of 5 g. lithium aluminum hydride in 450 ml. dioxane at 70° while stirring, and stirring is continued for ½ hour. The mixture is cooled, carefully diluted with water, filtered, the residue washed with dioxane and the filtrate evaporated in vacuo. The residue is taken up in diethyl ether, the solution shaken with charcoal, filtered, the filtrate evaporated and the residue recrystallized from diethyl ether-petroleum ether, to yield the 3-chloro-4-morpholino-benzyl alcohol melting at 80–81°.

The mixture of 17 g. thereof, 200 ml. benzene and 20 g. thionyl chloride is refluxed for 4 hours, cooled and filtered. The filtrate is evaporated in vacuo, the residue taken up in ice water and extracted with diethyl ether. The extract is washed with aqueous sodium bicarbonate, dried, filtered and evaporated. The residue is recrystallized from petroleum ether, to yield the 3-chloro-4-morpholino-benzyl chloride melting at 58–60°.

The solution of 5 g. thereof in 10 ml. dimethylsulfoxide is added dropwise to the suspension of 2.5 g. vacuum-dried sodium cyanide in 50 ml. dimethylsulfoxide while stirring, whereby the temperature is rising to 40°. The mixture is stirred for ½ hour at 60°, cooled, diluted with 250 ml. ice water and extracted with ethyl acetate-diethyl ether (1:1). The extract is dried, evaporated in vacuo and the residue recrystallized from petroleum ether, to yield the (3-chloro-4-morpholino-phenyl)-acetonitrile melting at 124–126°.

In the analogous manner the following compounds are prepared: 3-nitro-4 - piperidino - benzoic acid M.P. 198–201°, 3-amino-4-piperidino-benzoic acid M.P. 180°, 3-chloro-4 - piperidino - benzoic acid M.P. 165–167°, its ethyl ester M.P. 48–49° or B.P. 130°/0.1 mm. Hg, 3-chloro-4-piperidino-benzyl alcohol B.P. 130°/0.2 mm. Hg, 3-chloro-4-piperidino-benzyl chloride and (3 - chloro-4-piperidino-phenyl)-acetonitrile M.P. 55–56°.

EXAMPLE 14

To the solution of 2 g. (3-chloro-4-piperidino-phenyl)-acetonitrile in 150 ml. ethylene glycol, 5 g. potassium hydroxide in 30 ml. water are added and the mixture heated for 18 hours to 130–140°. It is cooled, diluted with 400 ml. water, acidified with 2 N hydrochloric acid to a pH of about 3 and extracted with diethyl ether. The extract is shaken with saturated aqueous sodium bicarbonate and the aqueous layer acidified with 2 N hydrochloric acid to a pH of about 3. It is extracted with diethyl ether, the extract dried, evaporated and the residue recrystallized from diethyl ether-petroleum ether, to yield the (3-chloro-4-piperidino-phenyl)-acetic acid of the formula

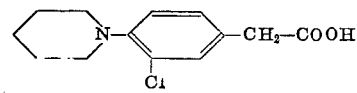

melting at 106–107°.

EXAMPLE 15

The mixture of 8.8 g. methyl (3-amino-phenyl)-acetate, 25.2 g. 1,5-dibromo-pentane, 13.8 g. diisopropyl-ethyl-amine and 40 ml. ethanol is refluxed overnight and the ethanol removed by distillation. The residue is taken up in diethyl ether, the solution extracted with 4 N hydrochloric acid, the extract cooled and made basic with 20% aqueous sodium hydroxide. It is extracted with diethyl ether, the extract washed with water, dried and evaporated. The residue is distilled and the fraction boiling at 105–115°/0.05 mm. collected, to yield the methyl (3-piperidino-phenyl)-acetate of the formula

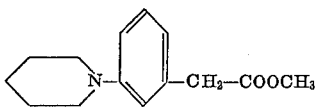

The solution of 6.28 g. thereof in 50 ml. 6 N hydrochloric acid is refluxed for 3 hours and evaporated in vacuo. The residue is recrystallized from water to yield the (3-piperidino-phenyl-acetic acid hydrochloride melting at 242–245°.

EXAMPLE 16

The mixture of 25 g. ethyl (3-chloro-4-amino-phenyl-acetate hydrochloride, 46 g. 1,5-dibromo-pentane, 65 g. diisopropylethylamine and 300 ml. dimethylformamide is heated for 30 hours to 100° and evaporated in vacuo. The residue is taken up in diethyl ether, the solution filtered, the filtrate washed with water and extracted with 2 N hydrochloric acid. The acidic solution is neutralized with aqueous sodium hydroxide and extracted with diethyl ether. The extract is evaporated, the residue heated with 300 ml. 6 N hydrochloric acid for 16 hours to 100° and the mixture evaporated in vacuo. The residue is recrystallized from methanol-diethyl ether to yield the (3-chloro-4-piperidino-phenyl) - acetic acid hydrochloride melting at 205–208°. The corresponding free acid resulting from an aqueous solution at a pH of about 3–4 is identical with the compound obtained according to Example 14.

The starting material is prepared as follows: The mixture of 100 g. (4-amino-phenyl)-acetic acid and 200 ml. acetanhydride is heated at the steam cone for 15 minutes and evaporated. The residue is stirred with 500 ml. hot water until complete dissolution occurs. The solution is cooled and the precipitate formed filtered off, to yield the (4-acetamino-phenyl)-acetic acid melting at 168–170°.

Into the solution of 77 g. thereof in 400 ml. glacial acetic acid, a slow stream of chlorine is bubbled at 50° until the spot of the starting material has disappeared in the thin layer chromatogram (4 ml. chloroform-ethyl acetate 1:1 and 4 drops formic acid). The mixture is cooled, the precipitate filtered off to yield the crude (3-chloro-4-acetamino-phenyl)-acetic acid.

The mixture of 69 g. thereof and 400 ml. saturated ethanolic hydrochloric aicd is refluxed for 3 hours and cooled. The precipitate formed is filtered off and washed with ethanol to yield the ethyl (3-chloro-4-amino-phenyl)-acetate hydrochloride melting at 167–168°.

EXAMPLE 17

The mixture of 20 g. ethyl (3-chloro-4-amino-phenyl)-acetate hydrochloride, 34.6 g. 1,4-dibromo-butane, 52 g. diisopropylethylamine and 300 ml. dimethylformamide is heated for 40 hours to 100° and evaporated in vacuo. The residue is taken up in diethyl ether, the solution filtered, the filtrate washed with water and extracted with 2 N hydrochloric acid. The aqueous solution is neutralized with aqueous sodium hydroxide, extracted with diethyl ether and the extract evaporated. The residue is taken up in 300 ml. 6 N hydrochloric acid and the mixture heated for 16 hours to 100°. It is evaporated in vacuo and the residue recrystallized from methanol-diethyl ether, to yield the (3-chloro-4-pyrrolidinophenyl)-acetic acid hydrochloride of the formula

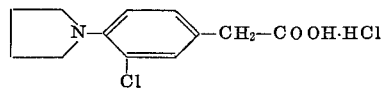

melting at 194–196°.

EXAMPLE 18

The mixture of 35.8 g. ethyl (4-amino-phenyl)-acetate, 600 ml. dimethylformamide, 86.4 g. 1,4-dibromo-butane and 156 g. disopropyl-ethylamine is heated at the steam bath for 45 hours and evaporated under reduced pressure. The residue is taken up in water, the mixture extracted with diethyl ether and the extract washed with 2 N hydrochloric acid. The aqueous solution is made strongly basic with aqueous sodium hydroxide and the mixture refluxed until dissolution is complete. It is cooled, washed with diethyl ether, the aqueous layer slowly acidified with 2 N hydrochloric acid to a pH of about 4–5 and extracted with diethyl ether. The extract is dried, concentrated, the concentrate diluted with petroleum ether and the precipitate formed filtered off to yield the (4-pyrrolidino-phenyl)-acetic acid of the formula

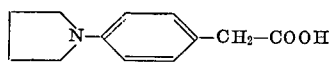

melting at 138–141°.

EXAMPLE 19

To the mixture of 4.37 g. sodium amide and 500 ml. liquid ammonia, 20 g. ethyl (4-pyrrolidino-phenyl)-acetate are slowly added while stirring, followed by the dropwise addition of 14.04 g. methyl iodide. The mixture is stirred for 2 hours and evaporated. The residue is taken up in 200 ml. ice cold 20% phosphoric acid, the mixture made basic with sodium hydroxide to a pH of 8–9 and extracted with diethyl ether. The extract is dried and evaporated to yield the ethyl α-(4-pyrrolidino-phenyl)-propionate.

The mixture of 15 g. thereof and 200 ml. 25% potassium hydroxide is heated for 1 hour to 100°. It is cooled, acidified with hydrochloric acid to a pH of 4–5, the mixture extracted with diethyl ether, the extract dried and concentrated. To the hot concrete petroleum ether is added until turbid and the precipitate formed in the cold filtered off, to yield the α-(4-pyrrolidinophenyl)-propionic acid of the formula

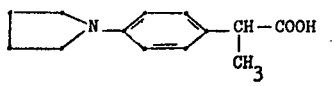

melting at 142°.

EXAMPLE 20

The mixture of 100 g. 4-hexamethyleneimino-acetophenone, 300 ml. morpholine, 25 g. sulfur and 2 g. p-toluene sulfonic acid is refluxed overnight while stirring. It is concentrated under reduced pressure to about half of its original volume, the concentrate cooled and poured into 500 ml. methanol. The mixture is kept overnight in the refrigerator, filtered and the residue recrystallized from methanol, to yield the (4-hexamethyleneiminophenyl)-thioacetmorpholid melting at 129°.

The mixture of 100 g. thereof and 500 ml. 25% potassium hydroxide in ethylene glycol-water (1:2) is refluxed until homogeneous. It is filtered, the filtrate washed with diethyl ether, the aqueous solution acidified with 2 N hydrochloric acid and again washed with diethyl ether. To the aqueous layer di-potassium hydrogen phosphate is slowly added until the pH is 4.5 and the whole is extrated with diethyl ether. The extract is dried, concentrated, and the concentrate diluted with petroleum ether, to yield the (4-hexamethyleneimino-phenyl)-acetic acid of the formula

melting at 100–102°.

EXAMPLE 21

The mixture of 3.78 liters dimethylformamide, 250 g. ethyl 4-amino-phenylacetate, 690 g. 1,5-dibromopentane and 840 g. sodium bicarbonate is stirred and refluxed for 2.5 hours. It is concentrated in vacuo to about 800 ml. and filtered. The solid is washed with diethyl ether, the filtrate evaporated, the residue distilled first through a 30 cm. packed column, the fraction boiling at 24°/0.16 mm. to 142°/0.17 mm. Hg discarded and the remaining portion distilled without said column, to yield the ethyl (4-piperidinophenyl)-acetate boiling at 138/142°/0.17 mm. Hg; it is identical with that obtained in Example 6.

EXAMPLE 22

To the mixture of 2 liters anhydrous ammonia and 9.5 g. sodium amide, the solution of 50 g. ethyl (4-piperidinophenyl)-acetate in 150 ml. diethyl ether is added dropwise over 20 minutes whereupon 33 g. methyl iodide in 100 ml. diethyl ether are added over 20 minutes while stirring and stirring is continued for 1.5 hours. Then 50 g. ammonium chloride are added and the ammonia is evaporated on the steam bath. The residue is taken up in diethyl ether and the mixture made basic with aqueous sodium hydroxide. The ethereal layer is separated, the aqueous solution extracted with more ether and the organic phase evaporated. Upon standing overnight a white solid forms, which is filtered off, to yield a minor portion of the α-(4-piperidinophenyl)-propionamide of the formula

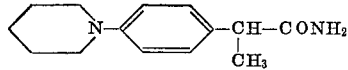

melting at 165–167°.

The major portion is taken up in diethyl ether, the solution gassed with hydrogen chloride and the precipitate formed filtered off and recrystallized from ethanol-diethyl ether, to yield the ethyl α-(4-piperidinophenyl)-propionate hydrochloride melting at 190–192°; it is identical with that described in Example 6.

EXAMPLE 23

The solution of 3.9 g. ethyl α-(4-piperidinophenyl)-propionate in the minimum amount of diethyl ether is gassed with dry chlorine and the course of the chlorination can readily be followed by thin layer chromatography. Upon completed chlorination the mixture is filtered and the filtrate evaporated. The residue is taken up in 100 ml. 20% aqueous sodium hydroxide and the mixture heated at the steam cone for 2 hours while stirring. It is made slightly acidic with hydrochloric acid, buffered with aqueous dispotassium phosphate and extracted with diethyl ether. The extract is dried, evaporated and the residue recrystallized from hexane, to yield the α-(3-chloro-4-piperidinophenyl)-propionic acid of the formula

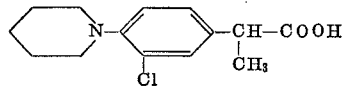

melting at 95–97°.

EXAMPLE 24

The mixture of 25 g. ethyl α-(3chloro-4-aminophenyl)-propionate, 26 g. 1,5-dibromopentane, 400 ml. dimethyl formamide and 65 g. N,N-di-isopropyl-ethylamine is stirred at the steam cone for 80 hours and concentrated in vacuo to about ½ of its volume. The concentrate is filtered, the residue washed with diethyl ether and the filtrate evaporated in vacuo. The mixture of 4.125 g. of the residue and 150 ml. 6 N hydrochloric acid is stirred for 15 hours at 100°, cooled, made alkaline to pH of about 10 with aqueous sodium hydroxide and evaporated in vacuo. The residue is taken up in ethanol, the solution filtered, evaporated and the residue recrystallized from diethyl ether, to yield the sodium α-(3-chloro-4-piperidinophenyl)-propionate of the formula

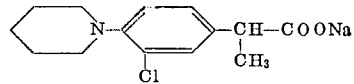

melting at 206–210°.

The starting material is prepared as follows:

Through the stirred, refluxing mixture of 5 liters anhydrous ethanol and 1 kg. 4-aminophenyl-acetic acid, dry hydrogen chloride is bubbled for 5.5 hours and stirring and refluxing is continued for 4 hours, and after cooling overnight to 10°, the mixture is filtered and the residue washed with cold anhydrous ethanol. It is dissolved in 8 liters water and 50 ml. portions of 50% aqueous sodium hydroxide are added while stirring until the mixture is basic and stirring is continued for 1 hour at room temperature. The precipitate formed is filtered off and washed with water, to yield the ethyl 4-aminophenyl-acetate, melting at 47–49°.

200 g. thereof are dissolved in 250 ml. acetic acid anhydride and the solution allowed to stand for ten minutes. It is poured onto 1.5 liters of ice and water while stirring, the precipitate formed filtered off and washed with water, to yield the ethyl 4-acetylaminophenyl-acetate melting at 75–78°.

The solution of 170 g. thereof in 25 ml. diethyl ether is added to the mixture, prepared from 20.38 g. sodium, 2 liters anhydrous ammonia and a few crystals of ferric nitrate nonahydrate, during 25 minutes while stirring. Thereupon the solution of 120.28 g. methyl iodide in 50 ml. diethyl ether is added dropwise over 20 minutes and stirring is continued for 1 hour. Thereupon 50 g. ammonium chloride are added, the mixture evaporated and the residue taken up in diethyl ether and diluted aqueous sodium hydroxide. The basic solution is extracted with diethyl ether and the combined organic phases evaporated, to yield the ethyl α-(4-acetylamino-phenyl)-propionate melting at 84–86°. This about 90% pure material is distilled over a short path column, and the fraction boiling at 170–183°/0.15 mm. Hg collected.

72 g. thereof are dissolved in 200 ml. acetic acid and gaseous chlorine is bubbled through the solution while stirring and keeping the temperature between 15–20° C. Progress of the reaction is followed by thin layer chromatography in diethyl ether hexane 4:1 ($R_f=0.8$ product, $R_f=0.51$ starting material). After completed chlorination the mixture is evaporated, the residue distilled and the fraction boiling at 155–160°/0.7 mm. Hg collected; it represents the ethyl α-(3-chloro-4-acetylaminophenyl)-propionate.

The mixture of 60 g. thereof and 200 ml. ethanol is saturated with gaseous hydrogen chloride and refluxed for 1 hour. It is evaporated in vacuo, the residue taken up in aqueous sodium hydroxide and the mixture extracted with diethyl ether. The extract is evaporated and the residue chromatographed on alumina, using cyclohexane-ethyl acetate (95:5) as eluent, to yield the ethyl α-(3-chloro-4-aminophenyl)-propionate, melting at 168–170°.

EXAMPLE 25

To the stirred mixture of 14.9 g. silver nitrate, 8.8 g. sodium hydroxide and 88 ml. water, 10.5 g. α-cyclopropyl-α-(4-piperidinophenyl)-acetaldehyde are added at room temperature and stirring is continued for 18 hours. It is filtered with the aid of infusorial earth and the filtrate neutralized with hydrochloric acid. It is lyophilized, the residue triturated repeatedly with small portions of methanol and filtered. The methanol solution is evaporated, the residue taken up in 10 ml. acetonitrile and 12 ml. bis-(trimethylsilyl)-trifluoroacetamide and the solution filtered. The filtrate is evaporated and trimethylsilyl ester formed slowly distilled in a short-path distilling apparatus at 0.02 mm. Hg. The fraction obtained at the bath temperature of 120° is collected, dissolved in 10 ml. aqueous methanol, the solution allowed to stand for 20 minutes and evaporated, to yield the α-cyclopropyl-α-(4-piperidinophenyl)-acetic acid of the formula

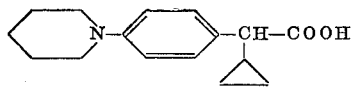

melting at 149–151°, after recrystallization from methanol.

The starting material is prepared as follows: The mixture of 5.7 g. sodium hydride and 120 ml. anhydrous dimethylsulfoxide is heated under nitrogen to 60–70° for one hour while stirring. It is cooled, diluted with 120 ml. dry tetrahydrofuran and the solution of 49.1 g. trimethylsulfonium iodide in 195 ml. dimethylsulfoxide is added as rapidly as possible while keeping the temperature at about −10°. After stirring for one minute, the solution of 22.9 g. 4-piperidinophenyl cyclopropylketone in 195 ml. tetrahydrofuran is added and the mixture stirred for 5–10 minutes. It is filtered through a sintered glass funnel, the filtrate diluted with three times its volume of water and extracted with diethyl ether. The extract is washed eight times with water, once with saturated aqueous sodium chloride, dried and evaporated in vacuo to yield 1-cyclopropyl-1-(4-piperidinophenyl)-ethyleneoxide.

23 g. thereof are added to the solution of 1.9 g. anhydrous p-toluenesulfonic acid in 600 ml. benzene and the mixture is refluxed for 18 hours. It is cooled, washed with aqueous sodium bicarbonate and water, dried and evaporated in vacuo, to yield the α-cyclopropyl-α-(4-piperidinophenyl)-acetaldehyde.

EXAMPLE 26

The mixture of 1 g. α-cyclopropyl-α-(4-piperidinophenyl)-acetic acid and 10 ml. saturated methanolic hydrochloric acid is heated on the steam cone and slowly evaporated. The residue is taken up in chloroform, the solution washed with saturated, aqueous sodium bicarbonate and water, dried and evaporated. The residue is distilled in a short-path distillation apparatus and the fraction boiling at a bath temperature of 118°/0.1 mm. Hg collected, to yield the methyl α-cyclopropyl-(4-piperidinophenyl)-acetate of the formula

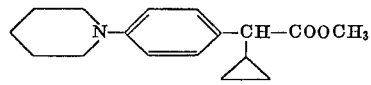

The free acid may also be obtained as follows: To the chromic acid solution prepared from 10 g. chromium trioxide, 16 g. concentrated sulfuric acid and water to make a total of 100 ml., the solution of 24 g. α-cyclopropyl-α-(4-piperidinophenyl)-acetaldehyde in 200 ml. acetone is slowly added while stirring at −15 to −20°, and stirring is continued for 2 hours. After standing overnight at room temperature, it is diluted with 600 ml. water and extracted ten times with 100 ml. portions of chloroform. The extract is dried, evaporated and the residue taken up in 36 ml. bis-(trimethylsilyl)-trifluoroacetamide and 20 ml. acetonitrile. The mixture is evaporated, the residue distilled in a high vacuum and the distillate taken up in aqueous methanol. After standing overnight the solution is evaporated and the residue recrystallized from methanol, to yield the α-cyclopropyl-α-(4-piperidinophenyl)-acetic acid melting at 148–150°.

EXAMPLE 27

The mixture of 75 g. [4-(4-methylpiperazino)-phenyl]-thioacetmorpholid, 400 ml. water, 200 ml. ethylene glycol and 150 g. potassium hydroxide is refluxed for 18 hours, cooled and washed with diethyl ether. Upon standing in the cold, a precipitate separates from the aqueous phase, which is filtered off and taken up in N hydrochloric acid. The solution is evaporated in vacuo, the residue taken up in isopropanol, the solution concentrated, the precipitate formed collected and recrystallized from isopropanol, to yield the [4-(4-methylpiperazino)-phenyl]-acetic acid dihydrochloride of the formula

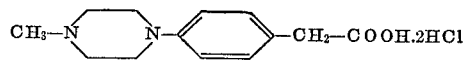

melting at 220–223°.

The starting material is prepared as follows:

The mixture of 100 g. 4-fluoro-acetophenone, 150 g. 1-methyl-piperazine and 250 ml. dimethyl sulfoxide is heated on the steam bath for 24 hours. It is poured into ice water, the precipitate formed collected and washed with water, to yield the 4-(4-methylpiperazino)-acetophenone melting at 98–99°.

The mixture of 120 g. thereof, 350 ml. morpholine, 40 g. sulfur and 5 g. p-toluene sulofnic acid is refluxed for 4 hours and evaporated in vacuo. The residue is taken up in water, the mixture extracted with diethyl ether, the extract dried, evaporated and the residue recrystallized from acetone, to yield the 14 - (4 - methylpiperazino)-phenyl]-thioacetmorpholid melting at 208–211°.

EXAMPLE 28

The solution of 25 g. ethyl (4-morpholinophenyl)-acetate in 25 ml. diethyl ether is added during 20 minutes to the stirred mixture of 3.86 g. sodium amide and 700 ml. liquid ammonia and stirring is continued for ½ an hour. Thereupon 14.1 g. methyl iodide in 20 ml. diethyl ether are added during ½ an hour, the mixture stirred for 2 hours and allowed to evaporate. The residue is taken up in 5% aqueous sodium hydroxide, the mixture extracted with diethyl ether, the extract dried, evaporated and the residue triturated with ethanolic hydrochloric acid, to yield the ethyl α-(4-morpholinophenyl)-propionate hydrochloride of the formula

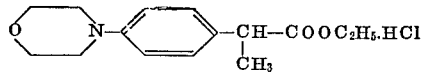

melting at 157–160°.

The mixture of 12 g. thereof and 100 ml. 25% aqueous sodium hydroxide is refluxed for one hour, cooled and neutralized with 2 N-hydrochloric acid. It is extracted with diethyl ether, the extract dried, evaporated and the residue recrystallized from diethyl ether-petroleum ether, to yield the α-(4-morpholinophenyl)-propionic acid melting at 144–146°.

The starting material is prepared as follows:

The mixture of 40 g. (4-morpholinophenyl)-acetic acid and 200 ml. saturated ethanolic hydrochloric acid is refluxed overnight and evaporated in vacuo. The residue is taken up in 5% aqueous sodium hydroxide, the mixture extracted with diethyl ether, the extract dried and evaporated to yield the ethyl (4-morpholinophenyl)-acetate.

EXAMPLE 29

Preparation of 10,000 tablets each containing 50.0 mg. of the active ingredient:

Formula:                                                G.
  Ethyl α - (4 - piperidino-phenyl)-propionate
    hydrochloride _____       500.00
  Lactose _____      1,706.00
  Corn starch _____          90.00
  Polyethylene glycol 6,000 _____         90.00
  Talcum powder _____           90.00
  Magnesium stearate _____          24.00
  Purified water, q.s.

Procedure

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 30

Preparation of 10,000 tablets each containing 10.0 mg. of the active ingredient:

Formula:                                                G.
  Sodium α - (3-chloro-4-piperidino-phenyl)-
    propionate _____      100.00
  Lactose _____      1,157.00
  Corn starch _____          75.00
  Polyethylene glycol 6,000 _____         75.00
  Talcum powder _____           75.00
  Magnesium stearate _____          18.00
  Purified water, q.s.

Procedure

All the powders are passed through a screen with openings of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml. water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

EXAMPLE 31

To the solution of 10 g. α-(4-piperidinophenyl)-propionic acid hydrochloride (Example 10) in 180 ml. warm acetic acid, about 110 ml. of a saturated solution of chlorine in acetic acid are added dropwise while stirring and following the progress of the reaction by thin-layer chromatography (mobile phase 2 ml. chloroform, 2 ml. ethyl acetate and 3 drops acetic acid; Rf starting material 0.57, product 0.81). Upon completion of chlorination, the mixture is evaporated in vacuo and the residual acetic acid stripped off azeotropically with toluene. The resulting oil crystallizes upon addition of diethyl ether and is recrystallized from ethanol-diethyl ether, to yield the α-(3-chloro-4-piperidinophenyl)-propionic acid hydrochloride melting at 198–200°.

EXAMPLE 32

The mixture of 195.3 g. ethyl α-(4-piperidinophenyl)-propionate hydrochloride (Example 6) and 600 ml. 25% aqueous sodium hydroxide is refluxed for 16 hours. The oil, separated from the aqueous phase, is decanted off and taken up in water. Both aqueous solutions are adjusted to pH 11 with diluted hydrochloric acid and washed with diethyl ether. The aqueous phase is further adjusted to pH 5.5 and extracted with diethyl ether. The extract is dried, evaporated and the residue recrystallized from diethyl ether-petroleum ether, to yield the α-(4-piperidinophenyl)-propionic acid melting at 91–94°.

69.2 g. thereof are dissolved in diethyl ether, and dry hydrogen chloride is bubbled through the solution for 15 minutes. The precipitate formed is filtered off and washed with diethyl ether, to yield the hydrochloride of said acid melting at 214–218°; it is identical with that obtained according to Example 10.

EXAMPLE 33

The mixture of 20.3 g. 4-fluorophenyl-acetonitrile, 50 ml. piperidine and 45 ml. dimethylsulfoxide is refluxed for 96 hours and then poured onto ice. The aqueous phase is extracted with diethyl ether, the extract dried, evaporated and the residue recrystallized from hexane, to yield the 4-piperidinophenyl-acetonitrile of the formula

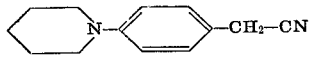

melting at 64–67° C.

It can also be prepared as follows: The mixture of 20 g. 4-aminophenyl-acetonitrile, 6.9 g. 1,5-dibromopentane, 6.5 g. N,N-diisopropyl-ethylamine and 300 ml. dimethylformamide is heated on a steam bath for 5 days. It is evaporated in vacuo, the residue taken up in water and the mixture extracted with diethyl ether. Processing this extract as shown above yields said nitrile.

EXAMPLE 34

Several starting materials mentioned previously can be prepared as follows: The mixture of 100 g. 4-fluoroacetophenone, 150 g. hexamethyleneimine, and 250 ml. dimethylsulfoxide is heated on the steam bath for 30 hours. The resulting solution is poured onto ice and the mixture extracted with diethyl ether. The extract is dried, filtered and evaporated, to yield the 4-hexamethyleneimino-acetophenone melting at 44–46°.

The mixture of 100 g. 4-fluoroacetophenone, 200 g. heptamethyleneimine and 250 ml. dimethylsulfoxide is heated on a steam bath for 24 hours and poured onto ice. The mixture is stirred for 15 minutes, the yellow solid formed filtered off and washed with water, to yield the 4-heptamethyleneimino-acetophenone melting at 45–47°.

In the analogous manner, the 4-(3-hydroxypiperidino) acetophenone, M.P. 93–95° and the 4-(4-hydroxypiperidino)acetophenone, M.P. 125–127° are prepared.

The above compounds can be converted into the compounds of the invention as shown in the previous examples, e.g. Example 12 or 20. From the last two materials, the compounds of the formulae

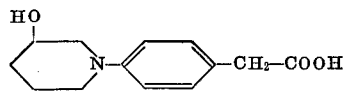

and

are prepared according to the method of said Example 20.

EXAMPLE 35

To the solution of 1.2 g. α-(4-piperidinophenyl)propionic acid in 25 ml. of diethyl ether, 0.8 ml. concentrated nitric acid are added while stirring and cooling in an ice bath. The supernatant solution is decanted off, the residual nitrate washed with diethyl ether, taken up in 5 ml. trifluoroacetic acid, the mixture slowly heated to 70° and subsequently evaporated in vacuo. The residue is taken up in diethyl ether, the solution gassed with hydrogen chloride, the precipitate formed filtered off and recrystallized from ethanol-diethyl ether, to yield the α-(3-nitro-4-piperidinophenyl)propionic acid hydrochloride of the formula

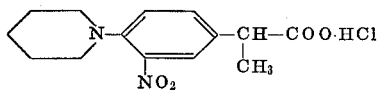

melting at 206–208°.

Equivalent amounts of said compound or, its following products, are processed in the manner described for the 3-nitro-4-morpholino-benzoic acid in Example 13, to yield the following products:

(a) methyl α-(3-nitro-4-piperidinophenyl)propionate,
(b) methyl α-(3-amino-4-piperidinophenyl)propionate,
(c) α-(3-amino-4-piperidinophenyl)propionic acid and the
(d) α-(3-chloro-4-piperidinophenyl)propionic acid and
(e) its ethyl ester, which latter 2 compounds are identical with the products obtained in Examples 23 and 24.

EXAMPLE 36

The solution of 30 g. 4-hexamethyleneiminophenylacetic acid (Example 20) in 200 ml. anhydrous ethanol is saturated with hydrogen chloride, the mixture refluxed for 16 hours and evaporated in vacuo. The residue is taken up in 6 N aqueous sodium hydroxide, the mixture extracted with diethyl ether, the extract dried, filtered and evaporated, to yield the ethyl 4-hexamethyleneiminophenylacetate.

The solution of 8.2 g. thereof in 10 ml. diethyl ether is added dropwise to the suspension prepared from 0.782 g. sodium, 500 ml. liquid ammonia and 2 crystals ferric nitrate nonahydrate while stirring for 20 minutes. Hereupon the solution of 8.91 g. methyl iodide in 10 ml. diethyl ether is added dropwise during 15 minutes and stirring is continued for 1 hour. After the addition of 5 g. ammonium chloride, the ammonia is allowed to evaporate, the residue is taken up in water, the mixture extracted with diethyl ether and the extract evaporated in vacuo, to yield the ethyl α-(4-hexamethyleneiminophenyl)propionate.

The mixture of 5 g. thereof and 50 ml. 6 N hydrochloric acid is refluxed for 18 hours on the steam bath and evaporated in vacuo. The residue is recrystallized from ethanol, to yield the α-(4-hexamethyleneiminophenyl)propionic acid hydrochloride of the formula

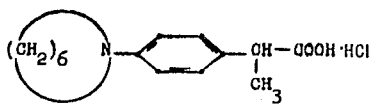

melting at 196–199°.

EXAMPLE 37

Saturated ethanolic solutions of 2 g. d,l-α-(3-chloro-4-piperidinophenyl)propionic acid (Example 23) and 1.18 g. l-α-(1-naphthyl)ethylamine are combined, the precipitate formed filtered off and recrystallized several times from ethanol, to yield the corresponding salt melting at 140–142°.

0.27 g. thereof are dissolved in 15 ml. 6 N aqueous sodium hydroxide, the solution washed with diethyl ether, acidified with 6 N hydrochloric acid to pH 5.5 and extracted with diethyl ether. The extract is washed with water, dried, filtered and evaporated, to yield the l-α-(3-chloro-4-piperidinophenyl)propionic acid having a $$[\alpha]_D^{25} = -38°$$

(ethanol).

Again, saturated ethanolic solutions of 3.67 g. d,l-α-(3-chloro-4-piperidinophenyl)propionic acid and 2.3 g. d-α-(1-naphthyl)ethylamine are combined, the precipitate formed collected and recrystallized several times from ethanol, to yield the corresponding salt melting at 141–142°.

0.34 g. thereof are dissolved in 20 ml. 6 N aqueous sodium hydroxide, the solution washed with diethyl ether, acidified with 6 N hydrochloric acid to pH 5.5 and extracted with diethyl ether. The extract is washed with water, dried, filtered and evaporated, to yield the d-α-(3-chloro-4-piperidinophenyl)propionic acid having an $$[\alpha]_D^{23} = +39.8°$$

(ethanol).

EXAMPLE 38

To the solution of 6 g. α-cyclopropyl-(4-piperidinophenyl)-acetic acid hydrochloride in 53 ml. acetic acid, about 200 ml. acetic acid saturated with chlorine are added dropwise while stirring, following the course of the chlorination by thin layer chromatography. Upon completed chlorination, the mixture is evaporated in vacuo, the residue taken up in 100 ml. water and 50 ml. ethanol and the solution is adjusted to pH 5.5 with 10% aqueous ammonia. The precipitate formed in the cold is collected and recrystallized once from cyclohexane and once from n-hexanecyclohexane, to yield the α-cyclopropyl-(3-chloro-4-piperidinophenyl)-acetic acid of the formula

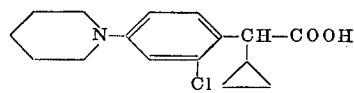

melting at 129–131°.

The starting material is prepared as follows: To the solution of 5.5 g. α-cyclopropyl-(4-piperidinophenyl)-acetic acid (Example 25) in 15 ml. chloroform and 25 ml. diethyl ether, saturated ethereal hydrogen chloride is added until the precipitate is complete. The mixture is filtered and the residue washed with diethyl ether, to yield the corresponding hydrochloride melting at 193–195° with decomposition.

EXAMPLE 39

The mixture of 10.8 g. ethyl 4-amino-phenylacetate hydrochloride, 32.4 g. 1,4-dibromo-2-butene, 84 g. sodium bicarbonate and 500 ml. dimethylformamide is refluxed for 6 hours while stirring, filtered hot and the filtrate evaporated in vacuo. The residue is taken up in 150 ml. 25% aqueous sodium hydroxide, the mixture refluxed for 1 hour, cooled and washed with diethyl ether. It is adjusted to pH 5 with hydrochloric acid, extracted with diethyl ether, the extract dried, filtered and evaporated, to yield the (4-pyrrolino-phenyl)-acetic acid of the formula

melting at 162–165°.

EXAMPLE 40

To the mixture of 5.8 g. ethyl 4-piperidino-phenylacetate, 100 ml. dimethylformamide and 100 ml. toluene, 2.3 g. 54% sodium hydride in mineral oil are added portionwise during 1½ hour while stirring at room temperature. Stirring is continued for ½ hour and the solution of 6.8 g. methyl iodide in 25 ml. toluene is added during 20 minutes and stirring is continued overnight at room temperature. Hereupon 5 ml. water are added and the mixture evaporated in vacuo. The residue is taken up in water, the mixture extracted with diethyl ether, the extract dried and saturated with dry hydrogen chloride. The precipitate formed is filtered off and recrystallized from acetone, to yield the ethyl α-(4-piperidino-phenyl)-propionate hydrochloride melting at 190–192°; it is identical with the compound described in Example 6.

EXAMPLE 41

The mixture of 2.3 g. α-(4-piperidinophenyl)-propionic acid and 25 ml. thionyl chloride is refluxed for 1 hour and evaporated in vacuo. The residue is taken up in the minimum amount of benzene, the solution combined with a concentrated solution of 1.4 g. salicylic acid in benzene while stirring and the mixture allowed to stand overnight at room temperature. It is evaporated in vacuo, the residue taken up in water, the mixture adjusted with aqueous sodium hydroxide to pH of about 3.5–4 and extracted with diethyl ether. The extract is washed with water, dried, filtered, evaporated and the residue recrystallized from aqueous ethanol, to yield the salicyl α-(4-piperidinophenyl)-propionate of the formula

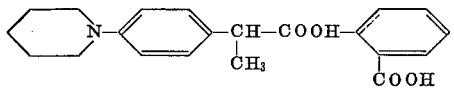

EXAMPLE 42

The mixture of 6.5 g. α-(3-nitro-4-piperidinophenyl)-propionic acid, 150 ml. ethyl acetate and 0.3 g. 10% palladium on charcoal is hydrogenated at room temperature and atmospheric pressure until the hydrogen uptake has stopped. It is filtered, the filtrate evaporated in vacuo and the residue recrystallized from ethyl acetate, to yield the α-(3-amino-4-piperidinophenyl)-propionic acid of the formula

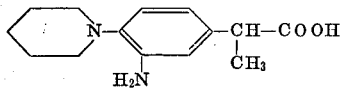

melting at 148–151°.

Said compound can be esterified as described in Example 5, the resulting ethyl ester reacted with 1,5-dibromopentane as descried in Example 16, the resulting ester saponified as described in Example 19, to yield the α-(3,4-bis-piperidinophenyl)-propionic acid. Said ester, acid or its hydrochloride can be chlorinated as described in Examples 23 or 31, to yield a mixture of the α-(2- and 5-chloro-3,4-bis-piperidinophenyl) - propionic acids or their hydrochlorides, which can be separated by fractional crystallization.

Chlorinating the α-(4-nitrophenyl)-propionic acid, one obtains the α-(2-chloro-4-nitrophenyl)-propionic acid, reducing it as described above, esterifying the resulting amino acid and reacting the resulting ester with 1,5-dibromo-pentane, one obtains the ethyl α-(2-chloro-4-piperidinophenyl)-propionate which can be saponified and salified to the free acid or its hydrochloride.

EXAMPLE 43

To the solution of 3 g. 2-(4-piperidinophenyl)-propanol in the minimum amount of acetic acid, a concentrated solution of chromium trioxide in 50% aqueous acetic acid is added dropwise while stirring, until no further color change is observed. The mixture is stirred overnight at room temperature, poured into water and the solution adjusted to pH 5.5 with aqueous sodium hydroxide. It is extracted with diethyl ether, the extract dried, filtered, evaporated, the residue combined with 20 ml. toluene which again is evaporated in vacuo. The residue is recrystallized from diethyl ether-petroleum ether, to yield the α-(4-piperidinophenyl)-propionic acid melting at 91–94°; it is identical with the product obtained according to Example 32.

The starting material is prepared as follows: The solution of 3.9 g. ethyl α-(4-nitrophenyl)-propionate in the minimum amount of diethyl ether is added dropwise to the mixture of 1.5 g. lithium aluminum hydride and 25 ml. diethyl ether while stirring. The mixture is refluxed for 2 hours and allowed to stand at room temperature overnight. It is combined with 50 ml. water, the aqueous phase extracted with diethyl ether, the combined organic solutions dried, filtered and evaporated, to yield the 2-(4-nitrophenyl)-propanol.

The mixture of 3 g. thereof, 100 ml. ethyl acetate and 0.2 g. 10% palladium on charcoal is hydrogenated at room temperature and atmospheric pressure until the hydrogen absorption ceases. It is filtered, and the filtrate evaporated in vacuo, to yield the 2-(4-aminophenyl)-propanol.

The mixture of 1.6 g. thereof, 2.3 g. 1,5-dibromopentane, 2.5 g. sodium bicarbonate and 50 ml. ethanol is stirred and refluxed at the steam cone overnight and evaporated. The residue is taken up in water, the mixture extracted with diethyl ether, the extract dried, filtered, the residue distilled and the fraction boiling at 250°/756 mm. Hg collected, to yield the 2-(4-piperidinophenyl)-propanol.

It is taken up in the minimum amount of diethyl ether, the solution acidified with ethereal hydrogen chloride and the precipitate formed filtered off, to yield the corresponding hydrochloride melting at 184–186°.

EXAMPLE 44

To the stirred mixture of 5.5 g. ethyl 4-pyrrolidino-phenylacetate, 100 ml. dimethylformamide and 100 ml. toluene, 1.25 g. 54% sodium hydride in mineral oil are added portionwise and stirring is continued for 1½ hours at room temperature. Here upon the solution of 6.8 g. methyl iodide in 25 ml. toluene is added dropwise during 20 minutes and the mixture is stirred overnight at room temperature. It is evaporated in vacuo, the residue taken up in 75 ml. 10% aqueous potassium hydroxide and the mixture heated at the steam cone for 2 hours. It is cooled, adjusted to pH 5 with hydrochloric acid, extracted with diethyl ether; the extract is dried, concentrated, the concentrate diluted with petroleum ether, and the precipitate formed filtered off, to yield the α-(4-pyrrolidinophenyl)-propionic acid melting at 141–143°; it is identical with that described in Example 19.

By replacing in this example or in Example 40 the methyliodide by an equivalent amount of ethyl iodide, allyl bromide, 3-cyclopentenyl bromide or cyclopropylmethyl bromide, the ethyl α-(4-pyrrolidino- or piperidinophenyl)-(butyrate, 4-pentenoate, α-3-cyclopentenylacetate or α-cyclopropylmethylacetate) are obtained. Similarly, the ethyl 4-piperidino-phenylacetate can be replaced by an equivalent amount of the ethyl 3- or 4-(pyrrolidino, pyrrolino, hexyleneimino, heptyleneimino, 3-aza-3-bicyclo-[3,2,1] or [3,3,0] octyl, morpholino or thiamorpholino)-phenylacetate, to yield the correspondingly 3- or 4-substituted ethyl α-phenylpropionates or their hydrochlorides, which can be saponified to the corresponding free acids or their hydrochlorides.

The 3- or 4-amino-phenylacetic or -α-phenylpropionic acid ethyl esters, sodium salts or the 2-, 3- or 4-chlorinated derivatives thereof, can also be reacted with 1,4-dibromo-2-butene, 1,5-dibromo-2-pentene or 1,6-dibromo-3-hexene in the presence of sodium bicarbonate, as shown in Example 39, to yield inter alia the ethyl 3- or 4-(pyrrolino, 2-pentenyleneimino or 3-hexenyleneimino)-phenylacetate or -α-phenylpropionate or the corresponding 4- or 3-chloro derivatives thereof.

Said unsaturated aminoacid esters can be epoxidized in the amino portion, for example, with the use of an equivalent amount of perbenzoic acid in chloroform or benzene, at 0–25°. The mixture is evaporated in vacuo, the residue taken up in water, the mixture extracted with diethyl ether, the extract washed with aqueous sodium bicarbonate, dried and evaporated, to yield the corresponding epoxides. The latter can be converted to the corresponding dihydroxy compounds by treatment with aqueous sodium hydroxide which simultaneously saponifies the ester. The aqueous solution is washed with diethyl ether, adjusted with hydrochloric acid to pH of about 5 and extracted with diethyl ether. The extract is dried, filtered and evaporated, to yield, for example, the α-[4-(3,4-dihydroxy-pyrrolidino)-phenyl]-propionic acid or the α-[3-chloro-4-(3, 4-dihydroxy-piperidino)-phenyl]-propionic acid.

The 3- or 4-amino-phenylacetic or -α-phenyl-propionic acid or the 2-, 3- or 4-chlorinated derivatives thereof, can also be reacted with ω-bromo-alkanoic acid bromides, e.g. ω-bromobutyric, -valeric or -caproic acid bromide or with aliphatic dicarboxylic acid dichlorides or anhydrides, e.g. succinic, glutaric, adipic or pimelic acid dichloride or maleic or glutaconic acid anhydride, to yield inter alia the α-[4-(2-oxo- or 2,5-dioxo-pyrrolidino)-phenyl]-propionic acid, α-[3-chloro-4-(2-oxo or 2,6-dioxo-piperidino)-phenyl]-propionic acid, the α-(4-(2,5-dioxo-pyrrolino)-phenylacetic acid or α-[3-chloro-(2,6-dioxo-hex-3-enyleneimino)-phenyl]-propionic acid.

Moreover, the 4-fluoro-phenyl-acetonitrile can be reacted with 4-oxo-piperidine, to yield the 4-(4-oxo-piperidino)-phenylacetonitrile, which can be hydrolyzed to the free acid and the acid esterified, or the ethyl α-(3-chloro-4-aminophenyl)-propionate, reacted with 4-oxo-2,5-heptadienedioic acid diethyl ester, saponifying and decarboxylating the reaction product, to yield the α-[3-chloro-4-(4-oxo-piperidino)-phenyl]-propionic acid. In corresponding esters, the carbonyl group can be reduced with one equivalent of Grignard compounds, e.g. methyl-, ethyl-, n-propyl-, phenyl- or 4-chlorophenyl-magnesium bromide, to yield, inter alia, the ethyl 4-[4-hydroxy-4-(methyl, ethyl, n-propyl, phenyl or 4-chlorophenyl)-piperidino]-phenyl acetate or α-[3-chloro-4-(4-hydroxy-4-methyl-piperidino)-phenyl]-propionate. Said esters or the corresponding acids can be dehydrated with sulfuric or phosphoric acid, to yield for example, the 4-(3-n-propyl-pent-2-enyleneimino)-phenylacetic acid or the α-[3-chloro-4-(3-methyl-pent-2-enyleneimino)-phenyl]-propionic acid.

EXAMPLE 45

To the mixture of 85.5 g. ethyl α-(3-chloro-4-aminophenyl)-propionate hydrochloride, 142 g. sodium carbonate and 600 ml. dimethyl formamide, 107 g. 1,4-dibromo-2-butene are added dropwise while stirring and the whole is refluxed for 5 hours and allowed to stand overnight at room temperature. The mixture is filtered, the filtrate evaporated in vacuo, the residue is triturated with hexane, the mixture filtered, the residue washed with petroleum ether and the filtrate evaporated. The residue is combined with 280 ml. 25% aqueous sodium hydroxide and the mixture refluxed for 8 hours. After cooling, it is diluted with water, washed with diethyl ether, the pH adjusted to 5–5.2 with hydrochloric acid and extracted with diethyl ether. The extract is dried, filtered, evaporated and the residue recrystallized from benzene-hexane, to yield the α-(3-chloro-4-pyrrolinophenyl)-propionic acid of the formula

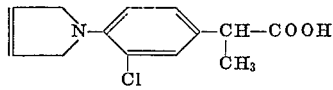

melting at 94–96°.

The starting material is prepared as follows:

To the solution of 52 g. ethyl 4-nitrophenylacetate in 350 ml. dimethyl formamide-toluene (1:1), 9.5 g. of 50% sodium hydride in mineral oil are added portionwise while stirring and cooling. After 1½ hours stirring at room temperature, 26 g. methyl iodide are added dropwise and the mixture is stirred overnight at room temperature. The mixture is carefully combined with water, extracted with diethyl ether, th e extract dried, filtered and evaporated. The residue is taken up in 100 ml. ethanol, the solution seeded with a few crystals starting material and allowed to stand in the cold. The precipitate formed is filtered off and the filtrate evaporated, to yield the ethyl α-(4-nitrophenyl)-propionate.

50 g. thereof are hydrogenated in 200 ml. of 95% aqueous ethanol over 0.4 g. palladium on charcoal until the hydrogen uptake ceases. The mixture is filtered, and the filtrate evaporated, to yield the ethyl α-(4-aminophenly)-propionate; (its hydrochloride melts at 137–140°). 25 g. thereof are combined with 100 ml. acetic acid anhydride while stirring and cooling and the mixture is allowed to stand for one hour at room temperature. It is evaporated in vacuo and the residue recrystallized from diethyl ether, to yield the ethyl α-(4-acetylaminophenyl)-propionate melting at 88–90°.

Through the solution of 25 g. thereof in 100 ml. acetic acid, chlorine is bubbled while stirring and cooling and the course of chlorination is followed by a thin layer chromatography on silica gel in hexane-diethyl ether (1:4). After the consumption of starting material, the mixture is evaporated in vacuo, the residue taken up in 150 ml. ethanol and hydrogen chloride is bubbled through the solution for 45 minutes. After refluxing for 15 hours, it is evaporated and the residue recrystallized from ethanol-diethyl ether, to yield the ethyl α-(3-chloro-4-aminophenyl)-propionate hydrochloride, melting at 164–168°; it is identical with that obtained according to Example 24.

EXAMPLE 46

To the solution of 25.1 g. d,l-α-(3-chloro-4-pyrrolinophenyl)-propionic acid (Example 45) in 450 ml. diethyl ether, 17.1 g. d-α-(1-naphthyl)-ethylamine are added while stirring and the mixture is evaporated in vacuo. The residue is recrystallized 7 times from ethanol-diethyl ether, to yield the corresponding salt melting at 133–135°. 5 g. thereof are dissolved in the minimum amount of 5% aqueous sodium hydroxide, the solution washed with diethyl ether, its pH adjusted to 5.5 with hydrochloric acid and extracted with diethyl ether. The extract is dried, filtered and evaporated, to yield the d-α-(3-chloro-4-pyrrolinophenyl)-propionic acid having $[\alpha]_D^{25} = +34.8°$ (ethanol).

EXAMPLE 47

The mixture of 4 g. ethyl α-(4-aminophenyl)-β-cyclopropylpropionate hydrochloride, 10.4 g. 1,5-dibromopentane, 6.2 g. sodium carbonate and 100 ml. dimethyl formamide is refluxed for 6 hours. After cooling, it is filtered, the filtrate concentrated in vacuo, the concentrate diluted with water and extracted with diethyl ether. The extract is dried, filtered, evaporated and the residue taken up in diethyl ether. The solution is gassed with hydrogen chloride, the precipitate formed filtered off and recrystallized from ethyl acetate, to yield the ethyl α-(4-piperidinophenyl)-β-cyclopropylpropionate hydrochloride of the formula

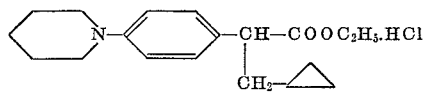

melting at 149–152°.

The mixture of 2 g. thereof and 100 ml. 25% aqueous sodium hydroxide is refluxed overnight and diluted with water. It is washed with diethyl ether, the pH adjusted to 5 with hydrochloric acid and extracted with diethyl ether. The extract is dried, filtered, evaporated and the residue recrystallized from diethyl ether, to yield the corresponding free acid melting at 112–114°.

The starting material is prepared as follows:

To the solution of 10 g. ethyl 4-nitrophenylacetate in 400 ml. dimethyl formamide-toluene (1:1), 2.5 g. 50% sodium hydride are added portionwise during 15 minutes while stirring and cooling with ice, after which the solution of 9.6 g. cyclopropylmethyl bromide in 50 ml. toluene is added dropwise and the mixture stirred overnight at room temperature. It is diluted with 200 ml. water, extracted with diethyl ether, the extract dried, evaporated, the residue distilled and the fraction boiling at 132–138°/

0.25 mm. Hg collected, to yield the ethyl α-(4-nitrophenyl)-β-cyclopropylpropionate.

The solution of 9 g. thereof in 100 ml. ethanol is hydrogenated over 0.5 g. 10% palladium on charcoal until the theoretical amount of hydrogen has been absorbed. The mixture is filtered, the filtrate evaporated in vacuo, the residue taken up in diethyl ether, the solution gassed with hydrogen chloride, the precipitate formed filtered off and recrystallized from ethyl acetate, to yield the ethyl α-(4-aminophenyl) - β - cyclopropylpropionate hydrochloride melting at 160–162°.

EXAMPLE 48

The mixture of 14 g. ethyl 4-aminophenylacetate and 60 ml. butyrolactone is refluxed for 24 hours and evaporated in vacuo. The residue is taken up in diethyl ether, the solution gassed with hydrogen chloride, the precipitate formed filtered off and the filtrate evaporated in vacuo. The residue is distilled and the fraction boiling at 171–175°/0.15 mm. Hg collected, to yield the ethyl 4-(2-oxopyrrolidino)-phenylacetate of the formula

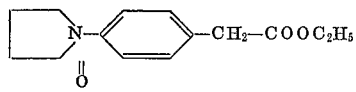

melting at 63–65°.

EXAMPLE 49

The mixture of 9 g. ethyl 4-aminophenylacetate, 14 g. divinyl sulfone and 25 ml. anhydrous ethanol is refluxed for 16 hours. It is combined with 5% hydrochloric acid, the mixture extracted with methylene chloride, the extract dried, filtered and evaporated to yield the ethyl 4-(1,1-dioxothiamorpholino)-phenylacetate of the formula

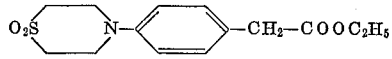

showing in the IR spectrum bands at 1120, 1305 and 1720 cm.$^{-1}$.

EXAMPLE 50

The mixture of 10 g. ethyl 4-aminophenylacetate, 16.4 g. α,α′-dibromo-o-xylene, 17.8 g. sodium carbonate and 250 ml. dimethylformamide is refluxed for 6 hours while stirring. After cooling, it is diluted with water, extracted with diethyl ether, the extract washed with water, dried, filtered, evaporated and the residue recrystallized from diethyl ether to yield the ethyl 4-isoindolinophenylacetate of the formula

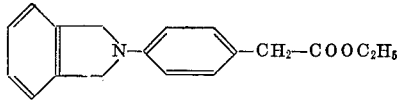

melting at 118–120°.

EXAMPLE 51

The commercial 1,4-dibromo - 2 - butene, containing mainly the trans epimer and being used in Examples 39 and 45, may be replaced by pure cis - 1,4 - dichloro-2-butene. The mixture of 11.3 g. thereof, 15.7 g. ethyl α-(4-aminophenyl)-propionate, 100 ml. dimethylformamide and 10.6 g. sodium carbonate is refluxed for 5 hours while stirring and allowed to stand overnight at room temperature. It is filtered, the filtrate evaporated in vacuo, the residue taken up in 260 ml. 25% aqueous sodium hydroxide and the mixture refluxed for 8 hours. It is cooled, diluted with water, washed with diethyl ether and the pH adjusted to about 5 with hydrochloric acid. The mixture is extracted with diethyl ether, the extract dryed, evaporated and the residue recrystallized from ethanol, to yield the α - (4 - pyrrolino - phenyl) - propionic acid of the formula

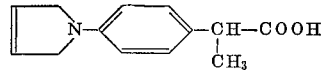

melting at 197–199°.

EXAMPLE 52

The mixture of 7 g. methyl α-cyclopropyl-(4-aminophenyl)-acetate, 10.22 g. 1,5-dibromo-pentane, 70 ml. dimethylformamide and 9.8 g. sodium carbonate is refluxed for 1½ hours while stirring and allowed to stand at room temperature overnight. It is diluted with diethyl ether, filtered, the filtrate combined with 100 ml. water and extracted with diethyl ether. The extract is washed with water, dried, filtered and evaporated, to yield the methyl α - cyclopropyl - (4 - piperidinophenyl) - acetate, which is identical with that obtained according to Example 26.

The starting material is prepared as follows: To the solution of 200 g. α-cyclopropyl-phenyl-acetic acid in 1.2 liters trifluoroacetic acid, the mixture of 73 ml. 70% aqueous nitric acid and 9.1 ml. 96% aqueous sulfuric acid is added dropwise while stirring and cooling to about 3°. After 1½ hours, the temperature is allowed to rise to room temperature and the mixture stirred for a total of 3 additional hours. It is dropped onto 3.2 kg. ice and 300 ml. water while stirring, filtered, the residue washed with 6 liters water and dried, to yield an about 2:1 mixture of α-cyclopropyl-(4- and 2-nitrophenyl)-acetic acid.

The mixture of 50 g. thereof, 5 g. 10% palladium on charcoal and 550 ml. 95% aqueous ethanol is hydrogenated at atmospheric pressure until 15.9 liters hydrogen have been consumed. It is filtered, the filtrate concentrated, the precipitate formed in the cold separated and recrystallized once more from ethanol, to yield the pure α-cyclopropyl-(4-aminophenyl)-acetic acid.

To the mixture of 10 g. thereof and 75 ml. methanol, 75 ml. saturated methanolic hydrogen chloride are added while stirring and cooling in an ice bath. After ½ hour, the mixture is heated to 38° for 1 hour and stirred at room temperature overnight. It is cooled, combined with 100 ml. water and 105 ml. 20% aqueous sodium hydroxide are added while cooling and stirring. The precipitate formed is filtered off, washed with water and dried, to yield the methyl α - cyclopropyl - (4 - aminophenyl)-acetate, melting at 68–69°.

EXAMPLE 53

The solution of 9.3 g. methyl α-cyclopropyl-(4-piperidino-phenyl)-acetate in 40 ml. diethyl ether and 1 ml. chloroform is acidified with ethereal hydrochloric acid. The precipitate formed is filtered off and taken up in 87 ml. glacial acetic acid. To the mixture obtained, 45 ml. of a saturated solution of chlorine in glacial acetic acid is added dropwise while stirring and stirring is continued for 20 minutes at room temperature. The mixture is concentrated in vacuo, the concentrate poured into 100 ml. ice water, the mixture adjusted to pH 9 with 10% aqueous sodium carbonate while cooling and extracted with methylene chloride. The extract is washed with water, dried, filtered and evaporated. The residue is taken up in the solution of 8.42 g. potassium hydroxide, 77 ml. methanol and 8 ml. water, the mixture refluxed for 3 hours and concentrated in vacuo. The concentrate is poured into 160 ml. ice water, the mixture acidified with 3 N hydrochloric acid to pH 4 and extracted with diethyl ether. The extract is washed with water, dried, filtered, evaporated and the residue recrystallized from ethanol, to yield the α-cyclopropyl-(3-chloro-4-piperidinophenyl)-acetic acid melting at 135.5–136.5°; it is somewhat purer than that obtained according to Example 38.

EXAMPLE 54

Preparation of 10,000 tablets each containing 25.0 mg. of the active ingredient:

| Formula: | G. |
|---|---|
| α-(3 - chloro - 4 - pyrrolinophenyl)-propionic acid | 250.00 |
| Lactos | 1,956.00 |
| Corn starch | 90.00 |

Formula:

| | G. |
|---|---|
| Polyethylene glycol 6,000 | 90.00 |
| Talcum powder | 90.00 |
| Magnesium stearate | 24.00 |
| Purified water, q.s. | |

Procedure

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

In the analogous manner, tablets can be prepared containing the same amount of another preferred drug substance of Formula II, e.g. the α-(4-pyrrolinophenyl)-propionic acid.

EXAMPLE 55

Preparation of 10,000 capsules each containing 10 mg. of the active ingredients:

Formula:

| | G. |
|---|---|
| α-Cyclopropyl - (3 - chloro - 4 - piperidino-phenyl)-acetic acid | 100.0 |
| Lactose | 1,800.0 |
| Talcum powder | 100.0 |

Procedure

All the powders are passed through a screen with an opening of 0.6 mm. Then the drug substance is placed in a suitable mixer and mixed first with the talcum, then with the lactose until homogenous. No. 3 capsules are filled with 200 mg., using a capsule filling machine.

In the analogous manner, capsules are prepared, containing any of the other compounds disclosed in the remaining examples, preferably of those listed under items (m), (n), (o) and (p) above.

EXAMPLE 56

The mixture of 17.9 g. 4-aminophenylacetic acid, 11.8 g. divinyl sulfone and 150 ml. water is refluxed for 2 hours, cooled and filtered. The residue is recrystallized from ethanol, to yield the 4-(1,1-dioxothiamorpholino)-penylacetic acid of the formula

melting at 158–160°.

EXAMPLE 57

The mixture of 13.2 g. ethyl α-(3-chloro-4-aminophenyl)-propionate hydrochloride, 7.4 g. phthalic anhydride, 10.1 g. triethylamine and 200 ml. toluene is refluxed for 6 hours and evaporated in vacuo. The residue is taken up in water, the mixture extracted with diethyl ether, the extract dried, filtered, evaporated and the residue recrystallized from diethyl ether, to yield the ethyl α-[3-chloro-4 - (1,3 - dioxo-isoindolino)-phenyl]-propionate of the formula

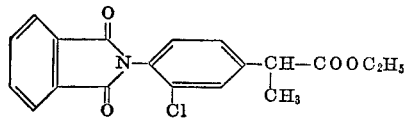

melting at 107–110°.

EXAMPLE 58

The mixture of 5 g. ethyl 4-aminophenylacetate, 3 g. succinic anhydride, 0.5 ml. triethylamine and 100 ml. toluene is refluxed for 24 hours and evaporated in vacuo. The residue is recrystallized from benzene, to yield the ethyl 4 - (2,5 - dioxo-pyrrolidino)-phenylacetate of the formula

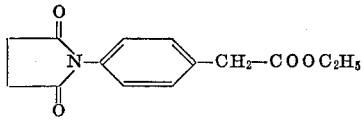

melting at 118–120°.

EXAMPLE 59

The mixture of 11.9 g. ethyl α-(4-aminophenyl)-β-cyclopropylpropionate, 14.2 g. cis-1,4-dichloro-2-butene, 19 g. sodium carbonate and 250 ml. dimethylformamide is refluxed for 6 hours while stirring. After cooling, it is filtered, the filtrate evaporated in vacuo and the residue recrystallized from hexane, to yield the ethyl α-(4-pyrrolinophenyl)-β-cyclopropylpropionate of the formula

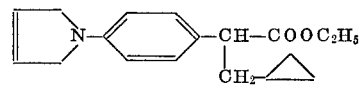

melting at 56–58°.

EXAMPLE 60

The mixture of 75 g. 4-(4-hydroxypiperidino)-phenyl-thioacetmorpholide and 300 ml. 25% aqueous potassium hydroxide is refluxed for 10 hours and allowed to stand in the cold overnight. The precipitate formed is filtered off and recrystallized from ethanol, to yield the sodium 4-(4-hydroxypiperidino)-phenylacetate of the formula

melting at 261–264°.

The starting material is prepared as follows: The mixture of 100 g. 4-(4-hydroxypiperidino)-acetophenone, 300 ml. morpholine, 20 g. sulfur and 1 g. p-toluene sulfonic acid is refluxed for 5 hours while stirring and allowed to stand overnight at room temperature. It is diluted with an equal volume of methanol, the mixture cooled, filtered and the residue recrystallized from methanol, to yield the 4-(4-hydroxypiperidino)-phenylthioacetmorpholide melting at 170–172°.

EXAMPLE 61

The solution of 40 g. sodium 4-(4-hydroxypiperidino)-phenylacetate in the minimum amount of water is acidified to pH 5 with hydrochloric acid and evaporated in vacuo. The residue is taken up in 200 ml. ethanolic hydrogen chloride, the mixture refluxed for 12 hours and evaporated in vacuo. The residue is combined with 150 ml. acetic anhydride and the mixture heated at the steam cone for 2½ hours. It is filtered, the filtrate evaporated in vacuo, the residue distilled and the fraction boiling at 149°/0.085 m. Hg collected, to yield the ethyl 4-(4-acetoxypiperidino)-phenylacetate of the formula

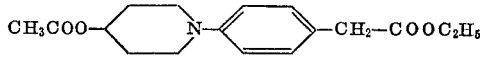

EXAMPLE 62

The solution of 13.7 g. ethyl 4-(4-acetoxypiperidino)-phenylacetate in 40 ml. diethyl ether is added dropwise during 35 minutes to the gray mixture obtained from 1.2 g. sodium, 1 crystal ferric nitrate nonahydrate and 700 ml. liquid ammonia. After stirring for 1½ hours, the solution of 7.42 g. methyl iodide in 25 ml. diethyl ether is added during ½ hour and the mixture stirred for an additional hour. Hereupon 5 g. ammonium chloride are added, the ammonia allowed to evaporate, the residue taken up in water and the mixture is extracted with diethyl ether. The extract is washed with water, dried, filtered, evaporated in vacuo, the residue distilled and the fraction boiling at 130°/0.1 mm. Hg collected, to yield the ethyl α-[4-(4-acetoxypiperidino)-phenyl]-propionate of the formula

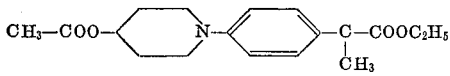

EXAMPLE 63

The mixture of 0.5 g. ethyl α-(4-aminophenyl)-isobutyrate, 0.4 g. cis-1,4-dichloro-2-butene, 0.4 g. sodium carbonate and 20 ml. dimethylformamide is refluxed for 10 hours, cooled and filtered. The filtrate is evaporated in vacuo, the residue distilled and the fraction boiling at 98°/0.22 mm. Hg collected, to yield the ethyl α-(4-pyrrolinophenyl)-isobutyrate of the formula

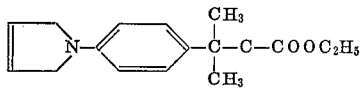

The starting material is prepared according to the method described in Example 45, but using 30.5 g. methyl iodide instead of 26 g. By this variation, a mixture of ethyl α-(4-aminophenyl)-propionate and -isobutyrate is obtained. The mixture of 4 g. thereof (containing about 20% of the latter), 1.1 g. potassium hydroxide, 250 ml. ethanol and 5 ml. water is refluxed for 1½ hours, cooled, diluted with water and extracted with diethyl ether. The extract is dried, evaporated, the residue distilled and the fraction boiling at 308–310°/760 mm. Hg collected, to yield the ethyl α-(4-aminophenyl)-isobutyrate.

We claim:
1. The α-(cyclic tert. aminophenyl)-aliphatic acid of the formula

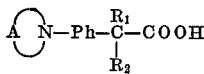

in which $R_1$ is hydrogen or lower alkyl, $R_2$ is 3 or 4 ring-membered cycloalkyl or cycloalkyl- methyl, Ph is 1,3- or 1,4-phenylene, (lower alkyl)-1,3- or 1,4-phenylene, (lower alkoxy)-1,3- or 1,4-phenylene, mono- or di-(halogeno)-1,3- or 1,4-phenylene, (trifluoromethyl)-1,3- or 1,4-phenylene, (nitro)-1,3- or 1,4-phenylene, (amino)-1,3- or 1,4-phenylene, (di-lower alkylamino)-1,3- or 1,4-phenylene or

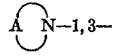

or 1,4-phenylene and the group

is monocyclic 5 to 7 ring-membered lower alkyleneimino, piperazino, morpholino, thiamorpholino or N-(lower alkyl, hydroxylower alkyl, HPh-lower alkyl or HPh) piperazino, or a lower alkyl ester, the ammonium salt, an alkali metal salt of a therapeutically useful acid addition salt thereof.

2. A compound as claimed in claim 1 and having the formula

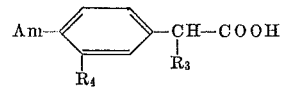

in which $R_3$ is cyclopropyl, cyclobutyl, cyclopropylmethyl or cyclobutylmethyl, $R_4$ is hydrogen, alkyl or alkoxy with up to 4 carbon atoms, halogeno, trifluoromethyl, nitro or amino, and Am is pyrrolidino, piperidino, 1,4-pentyleneimino, 2,5- or 1,6-hexyleneimino, 2,6- or 1,7-heptyleneimino, piperazino, 4-(methyl or ethyl)-piperazino, morpholino, 3,5-dimethylmorpholino, or thiamorpholino or the methyl, ethyl, n- or i-propyl or -butyl ester, the ammonium, sodium or potassium salt or a therapeutically useful acid addition salt thereof.

3. A compound of the formula shown in claim 1, in which $R_3$ is cyclopropyl or cyclopropylmethyl, $R_4$ is hydrogen or chloro, and Am is pyrrolidino, piperidino, hexamethyleneimino, heptamethyleneimino, 4-methylpiperazino, or [or] morpholino, or the methyl or ethyl ester, the ammonium, sodium or potassium salt or a therapeutically useful acid addition salt thereof.

4. A compound as claimed in claim 2 and being the α-cyclopropyl - (3 - chloro - 4 - piperidinophenyl)-acetic acid, or the methyl or ether ester, the ammonium, sodium or potassium salt or a therapeutically useful acid addition salt thereof.

References Cited

UNITED STATES PATENTS 1,915,334   6/1933   Salzberg et al. _____ 260—243
2,075,359   3/1937   Salzberg et al. _____ 424—250

HENRY R. JILES, Prmary Examiner

S. D. WINTERS, Assistant Examiner

U.S. Cl. X.R.

260—326.3, 239 BF 268 PH, 268 R 247.1 247.2 R 247.2 B, 247.2 A, 243 B, 293.83, 293.82, 293.79, 293.81, 247.5 R, 293 E, 326.1, 239 E, 239 B, 295 R, 326.11, 287 R, 244 R; 424—267, 274, 244, 250, 248, 246